(12) United States Patent
Morlock et al.

(10) Patent No.: US 6,278,074 B1
(45) Date of Patent: Aug. 21, 2001

(54) METHOD AND SYSTEM FOR WELDING RAILROAD RAILS

(75) Inventors: Michael J. Morlock, Chesterland; James W. Mumaw, Wadsworth, both of OH (US)

(73) Assignee: Lincoln Global, Inc., Monterey Park, CA (US)

(*) Notice: Subject to any disclaimer, the term of this patent is extended or adjusted under 35 U.S.C. 154(b) by 0 days.

(21) Appl. No.: 09/514,897

(22) Filed: Feb. 28, 2000

(51) Int. Cl.[7] ..................................................... B23K 9/12
(52) U.S. Cl. ................... 219/54; 219/124.34; 219/125.1; 901/42
(58) Field of Search ................................ 219/54, 124.34, 219/125.1; 901/42

(56) References Cited

U.S. PATENT DOCUMENTS

| | | | |
|---|---|---|---|
| 5,206,474 | * 4/1993 | Fukuoka et al. | 219/124.34 |
| 5,773,779 | 6/1998 | Morlock . | |
| 5,877,468 | 3/1999 | Morlock . | |
| 6,023,044 | * 2/2000 | Kosaka et al. | 219/124.34 |
| 6,133,545 | * 10/2000 | Okazaki et al. | 219/124.34 |

* cited by examiner

Primary Examiner—Clifford C. Shaw
(74) Attorney, Agent, or Firm—Vickers, Daniels & Young

(57) ABSTRACT

A method and system for automatically filing the narrow gap between facing end walls of adjacent first and second railway rails by depositing vertically spaced layers of molten metal in the gap with an electric arc welding torch using a robotic mechanism that moves the torch in a pattern controlled by a low level robotic execute program from a spatial position to a next spatial position, said method and system comprising: constructing a data array for a specific gap, said array constituting a series of positions making up an idealized progression of said torch to fill said gaps in vertically spaced layers made up of multiple positions, each of said fixed positions identified by at least four coordinates, including (1) at least x, y and z, (2) the layer in which said position is a part and (3) the welding parameters to be executed while said torch moves toward the next position; outputting data relating to a specific position from said data array; processing said welding parameters associated with said outputted data using said robotic execute program; then, outputting the new fixed data relating to the next position in said series of points; processing said welding parameters associated with said new data using said robotic execute program; and, repeating said outputting and processing acts until said positions in said data array relating to a specific layer have been processed. Thereafter the method or system repeats the layer or processes the next layer comprising multiple stored positions.

28 Claims, 13 Drawing Sheets

| POSITION | UF | (1a) LAYER | x | y | z | W | P | R | a | b | c |
|---|---|---|---|---|---|---|---|---|---|---|---|
| 1 | 3 | 1 | – | – | – | – | – | – | – | – | – |
| 2 | 3 | 1 | | | | | | | | | |
| ⋮ | ⋮ | ⋮ | | | | | | | | | |
| 7 | 4 | 2 | | | | | | | | | |
| 8 | 4 | 2 | | | | | | | | | |
| ⋮ | ⋮ | ⋮ | | | | | | | | | |
| 11 | 3 | 3 | | | | | | | | | |
| 12 | 3 | 3 | | | | STORED | | | | | |
| 13 | 3 | 3 | | | | | | | | | |
| ⋮ | ⋮ | ⋮ | | | | | | | | | |
| 25 | 3 | 5 | | | | | | | | | |
| 26 | 3 | 5 | | | | | | | | | |
| 27 | 3 | 5 | | | | | | | | | |
| ⋮ | ⋮ | ⋮ | | | | | | | | | |
| 130 | 4 | 19 | | | | | | | | | |
| 131 | 3 | 19 | | | | | | | | | |
| 132 | 3 | 19 | | | | | | | | | |

| POSITION | UF | LAYER | x | y | z | w | P | R | SCH | WEAVE | | | SP | DELAY |
|---|---|---|---|---|---|---|---|---|---|---|---|---|---|---|
| 1 | 3 | 1 | 148.00 | 8.00 | 0.00 | -3.00 | 5.00 | 0.00 | 6 | 0 | 0 | 0 | 30.0 | 0.3 |
| 2 | 3 | 1 | 151.00 | 8.00 | 0.00 | -3.00 | 5.00 | 0.00 | 6 | 0 | 0 | 0 | 6.0 | 0.3 |
| 3 | 4 | 1 | 151.00 | -10.00 | 0.00 | 3.00 | 5.00 | 0.00 | 16 | 0 | 0 | 0 | 30.0 | 0.3 |
| 4 | 4 | 1 | 154.00 | -10.00 | 0.00 | 3.00 | 5.00 | 0.00 | 16 | 0 | 0 | 0 | 6.0 | 0.3 |
| 5 | 2 | 2 | 155.00 | 0.00 | 4.40 | 0.00 | 0.00 | 0.00 | 16 | 0 | 0 | 0 | 75.0 | 0.0 |
| 6 | 2 | 2 | 147.00 | 0.00 | 4.40 | 1.70 | 0.00 | 0.00 | 6 | 0 | 0 | 0 | 30.0 | 0.5 |
| 7 | 4 | 2 | 107.00 | -8.00 | 6.40 | 3.80 | -2.00 | 0.00 | 16 | 0 | 0 | 0 | 40.0 | 0.0 |
| 8 | 4 | 2 | -1.50 | -8.00 | 6.40 | 4.70 | -2.00 | 0.00 | 16 | 4 | 1 | 0 | 20.0 | 0.7 |
| 9 | 2 | 2 | -1.50 | 0.00 | 6.40 | 0.00 | 2.50 | 0.00 | 9 | 0 | 0 | 0 | 30.0 | 0.0 |
| 10 | 2 | 2 | 155.00 | 0.00 | 6.40 | 0.00 | 2.50 | 0.00 | 9 | 0 | 0 | 0 | 13.0 | 0.7 |
| BASE FILL | | | | | | | | | | | | | | |
| 11 | 3 | 3 | 151.00 | 8.00 | 8.00 | -3.00 | -2.00 | 0.00 | 16 | 0 | 0 | 0 | 5.0 | 0.1 |
| 12 | 3 | 3 | 98.70 | 8.00 | 8.00 | -3.00 | -2.00 | 0.00 | 6 | 8 | 2 | 180 | 11.0 | 0.0 |
| 13 | 3 | 3 | 53.70 | 8.00 | 8.00 | -3.00 | -2.00 | 0.00 | 6 | 8 | 2 | 180 | 11.0 | 0.0 |
| 14 | 3 | 3 | 28.00 | 8.00 | 8.00 | -3.00 | -2.00 | 0.00 | 6 | 8 | 2 | 180 | 11.0 | 0.1 |
| 15 | 3 | 3 | 0.00 | 7.00 | 8.00 | -3.00 | -2.00 | 0.00 | 16 | 8 | 2 | 180 | 13.0 | 1.0 |
| 16 | 3 | 3 | 0.00 | 2.00 | 8.00 | -3.00 | -2.00 | 0.00 | 16 | 0 | 0 | 0 | 10.0 | 0.2 |
| 17 | 4 | 3 | 0.00 | -2.00 | 8.00 | 3.00 | -2.00 | 0.00 | 16 | 0 | 0 | 0 | 10.0 | 0.2 |
| 18 | 4 | 3 | 28.00 | -8.00 | 8.00 | 3.00 | 2.00 | 0.00 | 16 | 0 | 0 | 0 | 13.0 | 0.1 |
| 19 | 4 | 3 | 53.70 | -8.00 | 8.00 | 3.00 | 2.00 | 0.00 | 6 | 8 | 2 | 0 | 11.0 | 0.0 |
| 20 | 4 | 3 | 98.70 | -8.00 | 8.00 | 3.00 | 2.00 | 0.00 | 6 | 8 | 2 | 0 | 11.0 | 0.0 |
| 21 | 4 | 3 | 125.50 | -8.00 | 8.00 | 3.00 | 2.00 | 0.00 | 6 | 8 | 2 | 0 | 11.0 | 0.1 |
| 22 | 4 | 3 | 151.00 | -7.00 | 8.00 | 3.00 | 2.00 | 0.00 | 15 | 8 | 2 | 0 | 10.0 | 0.0 |
| 23 | 4 | 3 | 151.00 | -1.00 | 8.00 | 3.00 | 0.00 | 0.00 | 15 | 0 | 0 | 0 | 15.0 | 0.3 |
| 24 | 3 | 3 | 151.00 | 2.00 | 8.00 | -3.00 | 0.00 | 0.00 | 15 | 0 | 0 | 0 | 15.0 | 0.3 |
| BASE TAPER | | | | | | | | | | | | | | |
| 25 | 3 | 5 | 140.00 | 7.00 | 14.00 | -3.00 | -2.00 | 0.00 | 15 | 0 | 0 | 0 | 5.0 | 0.1 |
| 26 | 3 | 5 | 98.70 | 8.50 | 14.00 | -3.00 | -2.00 | 0.00 | 6 | 8 | 2 | 180 | 10.0 | 0.1 |
| 27 | 3 | 5 | 53.70 | 8.50 | 14.00 | -3.00 | -2.20 | 0.00 | 6 | 8 | 2 | 180 | 11.0 | 0.0 |
| 28 | 3 | 5 | 14.00 | 7.00 | 14.00 | -3.00 | -2.20 | 0.00 | 6 | 8 | 2 | 180 | 13.0 | 0.1 |
| 29 | 3 | 5 | 16.00 | 3.00 | 14.00 | -3.00 | -2.20 | 0.00 | 6 | 0 | 0 | 0 | 15.0 | 0.2 |
| 30 | 4 | 5 | 16.00 | -3.00 | 16.00 | 3.00 | -2.20 | 0.00 | 6 | 0 | 0 | 0 | 15.0 | 0.2 |
| 31 | 4 | 5 | 16.00 | -7.00 | 16.00 | 3.00 | 2.00 | 0.00 | 6 | 0 | 0 | 0 | 10.0 | 0.2 |
| 32 | 4 | 5 | 53.70 | -8.50 | 16.00 | 3.00 | 2.00 | 0.00 | 6 | 8 | 2 | 0 | 13.0 | 0.0 |
| 33 | 4 | 5 | 98.70 | -8.50 | 16.00 | 3.00 | 2.00 | 0.00 | 6 | 8 | 2 | 0 | 11.0 | 0.0 |
| 34 | 4 | 5 | 132.00 | -7.00 | 16.00 | 3.00 | 2.00 | 0.00 | 6 | 8 | 2 | 0 | 13.0 | 0.2 |
| 35 | 4 | 5 | 132.00 | -3.00 | 16.00 | 3.00 | 2.00 | 0.00 | 16 | 0 | 0 | 0 | 10.0 | 0.2 |
| 36 | 3 | 5 | 132.00 | 3.00 | 16.00 | -3.00 | -2.00 | 0.00 | 16 | 0 | 0 | 0 | 10.0 | 0.2 |
| 37 | 3 | 5 | 132.00 | 7.00 | 18.00 | -3.00 | -2.00 | 0.00 | 6 | 0 | 0 | 0 | 25.0 | 0.0 |

FIG. 4A

| 38 | 3 | 6 | 98.70 | 8.50 | 18.00 | -3.00 | -2.20 | 0.00 | 6 | 8 | 2 | 180 | 13.0 | 0.0 |
|---|---|---|---|---|---|---|---|---|---|---|---|---|---|---|
| 39 | 3 | 6 | 53.70 | 8.50 | 18.00 | -3.00 | -2.20 | 0.00 | 6 | 8 | 2 | 180 | 11.0 | 0.0 |
| 40 | 3 | 6 | 25.00 | 7.00 | 18.00 | -3.00 | -2.20 | 0.00 | 6 | 8 | 2 | 180 | 13.0 | 0.2 |
| 41 | 3 | 6 | 25.00 | 3.00 | 18.00 | -3.00 | -2.00 | 0.00 | 16 | 0 | 0 | 0 | 10.0 | 0.2 |
| 42 | 4 | 6 | 25.00 | -3.00 | 18.00 | 3.00 | 2.00 | 0.00 | 16 | 0 | 0 | 0 | 10.0 | 0.2 |
| 43 | 4 | 6 | 25.00 | -7.00 | 18.00 | 3.00 | 2.00 | 0.00 | 6 | 0 | 0 | 0 | 25.0 | 0.0 |
| 44 | 4 | 6 | 53.70 | -7.00 | 18.00 | 3.00 | 2.00 | 0.00 | 6 | 8 | 2 | 0 | 13.0 | 0.2 |
| 45 | 4 | 6 | 98.70 | -7.00 | 18.00 | 3.00 | -2.20 | 0.00 | 6 | 8 | 2 | 0 | 11.0 | 0.0 |
| 46 | 4 | 7 | 121.00 | -7.00 | 20.00 | 3.00 | -2.20 | 0.00 | 6 | 8 | 2 | 0 | 13.0 | 0.1 |
| 47 | 3 | 7 | 121.00 | 7.00 | 20.00 | -3.00 | -2.20 | 0.00 | 6 | 0 | 0 | 0 | 25.0 | 0.0 |
| 48 | 3 | 7 | 98.70 | 8.50 | 20.00 | -3.00 | -2.20 | 0.00 | 6 | 8 | 2 | 180 | 13.0 | 0.0 |
| 49 | 3 | 7 | 53.70 | 8.50 | 20.00 | -3.00 | 2.00 | 0.00 | 6 | 8 | 2 | 180 | 11.0 | 0.0 |
| 50 | 3 | 7 | 37.00 | 7.00 | 20.00 | -3.00 | 2.00 | 0.00 | 6 | 8 | 2 | 180 | 13.0 | 0.7 |
| 51 | 3 | 7 | 37.00 | 3.00 | 20.00 | -3.00 | 2.00 | 0.00 | 16 | 0 | 0 | 0 | 10.0 | 0.2 |
| 52 | 4 | 7 | 37.00 | -3.00 | 20.00 | 3.00 | 2.00 | 0.00 | 16 | 0 | 0 | 0 | 10.0 | 0.2 |
| 53 | 4 | 7 | 37.00 | -7.00 | 20.00 | 3.00 | 2.00 | 0.00 | 6 | 0 | 0 | 0 | 25.0 | 0.3 |
| 54 | 4 | 7 | 53.70 | -8.50 | 20.00 | 3.00 | 2.00 | 0.00 | 15 | 2 | 2 | 0 | 12.0 | 0.0 |
| 55 | 4 | 7 | 98.70 | -8.50 | 20.00 | 3.00 | 2.00 | 0.00 | 15 | 2 | 2 | 0 | 10.0 | 0.0 |
| 56 | 4 | 7 | 110.00 | -7.00 | 20.00 | 3.00 | 2.00 | 0.00 | 15 | 2 | 2 | 0 | 12.0 | 0.0 |
| 57 | 4 | 7 | 110.00 | -3.00 | 20.00 | 3.00 | 2.00 | 0.00 | 16 | 0 | 0 | 0 | 12.0 | 0.2 |
| 58 | 3 | 7 | 110.00 | 3.00 | 20.00 | -2.00 | -2.00 | 0.00 | 16 | 0 | 0 | 0 | 12.0 | 0.2 |
| 59 | 3 | 7 | 110.00 | 7.00 | 20.00 | -2.00 | -2.20 | 0.00 | 16 | 0 | 0 | 0 | 25.0 | 0.0 |
| 60 | 3 | 8 | 98.70 | 8.50 | 23.00 | -2.00 | -2.20 | 0.00 | 16 | 2 | 2 | 180 | 10.0 | 0.0 |
| 61 | 3 | 8 | 50.00 | 7.00 | 23.00 | -2.00 | -2.20 | 0.00 | 16 | 2 | 2 | 180 | 10.0 | 0.1 |
| 62 | 4 | 8 | 50.00 | -7.00 | 23.00 | 4.40 | -2.20 | 0.00 | 16 | 0 | 0 | 0 | 25.0 | 0.1 |
| 63 | 4 | 8 | 98.70 | -8.50 | 23.00 | 4.40 | 2.00 | 0.00 | 16 | 2 | 2 | 0 | 10.0 | 0.1 |
| 64 | 3 | 8 | 98.70 | 8.50 | 23.00 | -2.00 | -2.20 | 0.00 | 16 | 0 | 0 | 0 | 25.0 | 0.1 |
| 65 | 3 | 9 | 56.00 | 8.50 | 24.00 | -2.00 | -2.20 | 0.00 | 16 | 2 | 2 | 180 | 12.0 | 0.1 |
| 66 | 4 | 9 | 56.00 | -8.50 | 24.00 | 2.00 | -2.20 | 0.00 | 16 | 0 | 0 | 0 | 25.0 | 0.1 |
| 67 | 4 | 9 | 88.00 | -8.50 | 24.00 | 2.00 | -2.20 | 0.00 | 16 | 2 | 2 | 0 | 12.0 | 0.1 |
| 68 | 3 | 9 | 88.00 | 8.50 | 25.00 | -2.00 | 2.00 | 0.00 | 16 | 0 | 0 | 0 | 25.0 | 0.1 |
| 69 | 3 | 9 | 64.00 | 7.00 | 26.00 | -2.00 | -2.00 | 0.00 | 16 | 0 | 0 | 0 | 12.0 | 0.1 |
| 70 | 4 | 9 | 64.00 | -7.00 | 26.00 | 2.00 | 2.00 | 0.00 | 16 | 3 | 1 | 90 | 12.0 | 0.1 |
| 71 | 4 | 10 | 86.00 | -7.00 | 29.00 | 3.00 | -6.50 | 0.00 | 16 | 0 | 0 | 0 | 15.0 | 1.5 |
| 72 | 3 | 10 | 86.00 | 7.00 | 29.00 | -2.60 | -6.50 | 0.00 | 16 | 3 | 1 | 90 | 12.0 | 1.5 |
| 73 | 4 | 10 | 69.00 | -7.00 | 29.00 | 3.00 | 4.50 | 0.00 | 16 | 3 | 1 | 90 | 12.0 | 1.5 |
| 74 | 3 | 10 | 69.00 | 7.00 | 29.00 | -2.10 | 4.50 | 0.00 | 16 | 0 | 0 | 0 | 15.0 | 1.5 |
| 75 | 2 | 10 | 76.20 | 0.00 | 29.00 | 0.00 | 0.00 | 0.00 | 15 | 0 | 0 | 0 | 15.0 | 1.5 |

FIG. 4B

WEB FILL BOTTOM

| | | | | | | | | | | | | | | |
|---|---|---|---|---|---|---|---|---|---|---|---|---|---|---|
| 76 | 3 | 11 | 78.70 | 8.00 | 30.00 | -1.50 | 0.00 | 0.00 | 15 | 0 | 0 | 0 | 25.0 | 0.0 |
| 77 | 2 | 11 | 80.00 | 0.00 | 30.00 | 0.00 | 0.00 | 0.00 | 15 | 0 | 0 | 0 | 25.0 | 0.5 |
| 78 | 4 | 11 | 78.70 | -8.00 | 30.00 | 1.50 | 0.00 | 0.00 | 15 | 0 | 0 | 0 | 25.0 | 0.0 |
| 79 | 4 | 11 | 73.70 | -8.00 | 30.00 | 1.50 | 0.00 | 0.00 | 15 | 0 | 0 | 0 | 25.0 | 0.0 |
| 80 | 2 | 11 | 72.40 | 0.00 | 30.00 | 0.00 | 0.00 | 0.00 | 15 | 0 | 0 | 0 | 25.0 | 0.5 |
| 81 | 3 | 11 | 73.70 | 8.00 | 30.00 | -1.50 | 0.00 | 0.00 | 15 | 0 | 0 | 0 | 25.0 | 0.0 |

END WEB FILL BOTTOM

| | | | | | | | | | | | | | | |
|---|---|---|---|---|---|---|---|---|---|---|---|---|---|---|
| 82 | 2 | 12 | 81.00 | 0.00 | 58.00 | 0.00 | -1.50 | 0.00 | 5 | 0 | 0 | 0 | 25.0 | 0.0 |

WEB FILL TOP

| | | | | | | | | | | | | | | |
|---|---|---|---|---|---|---|---|---|---|---|---|---|---|---|
| 83 | 3 | 13 | 78.70 | 8.00 | 58.00 | -1.50 | 0.00 | 0.00 | 5 | 0 | 0 | 0 | 25.0 | 0.0 |
| 84 | 2 | 13 | 81.00 | 0.00 | 58.00 | 0.00 | 0.00 | 0.00 | 5 | 0 | 0 | 0 | 25.0 | 0.3 |
| 85 | 4 | 13 | 78.70 | -8.00 | 58.00 | 1.50 | 0.00 | 0.00 | 5 | 0 | 0 | 0 | 25.0 | 0.0 |
| 86 | 4 | 13 | 73.70 | -8.00 | 58.00 | 1.50 | 0.00 | 0.00 | 5 | 0 | 0 | 0 | 25.0 | 0.0 |
| 87 | 2 | 13 | 71.40 | 0.00 | 58.00 | 0.00 | 0.00 | 0.00 | 5 | 0 | 0 | 0 | 25.0 | 0.3 |
| 88 | 3 | 13 | 73.70 | 8.00 | 58.00 | -1.50 | 0.00 | 0.00 | 5 | 0 | 0 | 0 | 25.0 | 0.0 |

END OF WEB

| | | | | | | | | | | | | | | |
|---|---|---|---|---|---|---|---|---|---|---|---|---|---|---|
| 89 | 4 | 14 | 90.20 | -7.00 | 142.00 | 9.00 | -4.00 | 0.00 | 6 | 0 | 0 | 0 | 30.0 | 1.5 |
| 90 | 3 | 14 | 90.20 | 7.00 | 142.00 | -9.00 | -4.00 | 0.00 | 6 | 0 | 0 | 0 | 30.0 | 1.5 |
| 91 | 4 | 14 | 62.20 | -7.00 | 142.00 | 9.00 | 4.00 | 0.00 | 6 | 0 | 0 | 0 | 30.0 | 1.5 |
| 92 | 3 | 14 | 62.20 | 7.00 | 142.00 | -9.00 | 4.00 | 0.00 | 6 | 0 | 0 | 0 | 30.0 | 1.5 |
| 93 | 4 | 14 | 94.20 | -7.00 | 142.00 | 3.00 | 4.00 | 0.00 | 6 | 0 | 0 | 0 | 30.0 | 1.5 |
| 94 | 4 | 14 | 94.20 | -7.00 | 143.00 | 4.00 | -3.00 | 0.00 | 6 | 3 | 1 | 0 | 8.0 | 1.5 |
| 95 | 4 | 14 | 94.20 | -7.00 | 143.00 | 8.00 | -3.00 | 0.00 | 6 | 8 | 2 | 0 | 2.5 | 1.5 |
| 96 | 4 | 14 | 58.20 | -7.00 | 143.00 | 8.00 | 3.00 | 0.00 | 6 | 8 | 2 | 0 | 17.0 | 0.0 |
| 97 | 3 | 14 | 58.20 | 8.00 | 143.00 | 2.00 | 3.00 | 0.00 | 16 | 3 | 1 | 90 | 8.0 | 1.5 |
| 98 | 3 | 14 | 58.20 | 8.00 | 143.00 | -7.00 | 3.00 | 0.00 | 6 | 0 | 0 | 0 | 2.5 | 1.5 |
| 99 | 3 | 15 | 97.00 | 8.00 | 143.00 | -7.00 | -3.00 | 0.00 | 6 | 8 | 2 | 0 | 17.0 | 0.0 |
| 100 | 4 | 15 | 97.00 | -8.00 | 146.00 | -2.00 | -3.00 | 0.00 | 6 | 3 | 1 | 90 | 8.0 | 1.5 |
| 101 | 4 | 15 | 97.00 | -8.00 | 146.00 | 7.00 | -3.00 | 0.00 | 16 | 0 | 0 | 0 | 2.5 | 1.5 |
| 102 | 4 | 15 | 55.50 | -8.00 | 146.00 | 7.00 | 3.00 | 0.00 | 6 | 8 | 2 | 180 | 17.0 | 0.0 |
| 103 | 3 | 15 | 55.50 | 8.00 | 146.00 | 2.00 | 3.00 | 0.00 | 16 | 3 | 1 | 90 | 8.0 | 1.5 |
| 104 | 3 | 15 | 55.50 | 8.00 | 146.00 | -7.00 | 3.00 | 0.00 | 16 | 3 | 1 | 0 | 2.5 | 1.5 |
| 105 | 3 | 15 | 102.20 | 8.00 | 146.00 | -7.00 | -3.00 | 0.00 | 6 | 8 | 2 | 180 | 17.0 | 0.0 |
| 106 | 4 | 15 | 102.20 | -8.00 | 149.00 | -2.00 | -3.00 | 0.00 | 16 | 3 | 1 | 90 | 8.0 | 1.5 |
| 107 | 4 | 15 | 102.20 | -8.00 | 149.00 | 7.00 | -3.00 | 0.00 | 16 | 0 | 0 | 0 | 2.5 | 1.5 |
| 108 | 4 | 15 | 51.00 | -8.00 | 149.00 | 7.00 | 3.00 | 0.00 | 6 | 8 | 2 | 180 | 17.0 | 0.0 |
| 109 | 3 | 15 | 51.00 | 8.00 | 149.00 | 2.00 | 3.00 | 0.00 | 16 | 3 | 1 | 90 | 8.0 | 1.5 |
| 110 | 3 | 16 | 51.00 | 8.00 | 149.00 | -7.00 | 3.00 | 0.00 | 16 | 0 | 0 | 0 | 2.5 | 1.5 |

FIG. 4C

| 111 | 3 | 16 | 107.20 | 8.00 | 149.00 | -7.00 | -3.00 | 0.00 | 6 | 8 | 2 | 0 | 17.0 | 0.0 |
| 112 | 4 | 16 | 107.20 | -8.00 | 153.00 | -2.00 | -3.00 | 0.00 | 16 | 3 | 1 | 90 | 8.0 | 1.5 |
| 113 | 4 | 16 | 107.20 | -8.00 | 153.00 | 7.00 | -3.00 | 0.00 | 16 | 0 | 0 | 0 | 2.5 | 1.5 |
| 114 | 4 | 16 | 44.00 | -8.00 | 153.00 | 7.00 | 3.00 | 0.00 | 6 | 8 | 2 | 180 | 17.0 | 0.0 |
| 115 | 3 | 16 | 44.00 | 8.00 | 153.00 | 2.00 | 3.00 | 0.00 | 16 | 3 | 1 | 90 | 8.0 | 1.5 |
| 116 | 3 | 17 | 44.00 | 8.00 | 153.00 | -7.00 | 3.00 | 0.00 | 16 | 0 | 0 | 0 | 2.5 | 1.5 |
| 117 | 3 | 17 | 110.00 | 8.00 | 153.00 | -7.00 | -3.00 | 0.00 | 6 | 8 | 2 | 0 | 17.0 | 0.0 |

HEAD FILL

| 118 | 4 | 18 | 60.00 | -11.00 | 154.00 | 7.00 | 2.00 | 0.00 | 11 | 0 | 0 | 0 | 30.0 | 0.0 |
| 119 | 4 | 18 | 41.70 | -8.00 | 154.00 | 7.00 | 6.00 | 0.00 | 18 | 0 | 0 | 0 | 30.0 | 0.5 |
| 120 | 4 | 18 | 43.00 | -8.00 | 154.00 | 7.00 | 4.00 | 0.00 | 12 | 0 | 0 | 0 | 6.0 | 1.0 |
| 121 | 4 | 18 | 110.70 | -8.00 | 154.00 | 7.00 | -5.00 | 0.00 | 12 | 9 | 2 | 0 | 15.0 | 0.5 |
| 122 | 3 | 18 | 60.00 | 11.00 | 154.00 | -7.00 | 2.00 | 0.00 | 11 | 0 | 0 | 0 | 30.0 | 0.0 |
| 123 | 3 | 18 | 41.70 | 8.00 | 154.00 | -7.00 | 6.00 | 0.00 | 18 | 0 | 0 | 0 | 30.0 | 0.5 |
| 124 | 3 | 18 | 43.00 | 8.00 | 154.00 | -7.00 | 4.00 | 0.00 | 12 | 0 | 0 | 0 | 6.0 | 1.0 |
| 125 | 3 | 18 | 76.20 | 8.00 | 154.00 | -7.00 | 4.00 | 0.00 | 12 | 9 | 2 | 0 | 15.0 | 0.0 |
| 126 | 3 | 18 | 110.70 | 8.00 | 154.00 | -7.00 | -5.00 | 0.00 | 12 | 9 | 2 | 0 | 15.0 | 0.5 |

CAP PASS

| 127 | 4 | 19 | 60.00 | -11.00 | 180.00 | 7.00 | 2.00 | 0.00 | 11 | 0 | 0 | 0 | 30.0 | 0.0 |
| 128 | 4 | 19 | 46.70 | -8.00 | 180.00 | 7.00 | 5.00 | 0.00 | 18 | 0 | 0 | 0 | 30.0 | 0.5 |
| 129 | 4 | 19 | 48.00 | -8.00 | 180.00 | 7.00 | 4.00 | 0.00 | 12 | 0 | 0 | 0 | 6.0 | 1.0 |
| 130 | 4 | 19 | 105.70 | -8.00 | 180.00 | 7.00 | -5.00 | 0.00 | 12 | 9 | 2 | 0 | 15.0 | 0.0 |
| 131 | 3 | 19 | 60.00 | 11.00 | 180.00 | -7.00 | 2.00 | 0.00 | 11 | 0 | 0 | 0 | 30.0 | 0.0 |
| 132 | 3 | 19 | 46.70 | 8.00 | 180.00 | -7.00 | 5.00 | 0.00 | 18 | 0 | 0 | 0 | 30.0 | 0.5 |
| 133 | 3 | 19 | 48.00 | 8.00 | 180.00 | -7.00 | 4.00 | 0.00 | 12 | 0 | 0 | 0 | 6.0 | 1.0 |
| 134 | 3 | 19 | 76.20 | 8.00 | 180.00 | -7.00 | 4.00 | 0.00 | 12 | 9 | 2 | 0 | 15.0 | 0.0 |
| 135 | 3 | 19 | 105.70 | 8.00 | 180.00 | -7.00 | -5.00 | 0.00 | 12 | 9 | 2 | 0 | 15.0 | 0.0 |

CRATER FILL

| 136 | 2 | 20 | 85.00 | 0.00 | 185.00 | 0.00 | 0.00 | 0.00 | 16 | 0 | 0 | 0 | 50.0 | 2.0 |
| 137 | 2 | 20 | 75.00 | 0.00 | 185.00 | 0.00 | 0.00 | 0.00 | 16 | 0 | 0 | 0 | 30.0 | 2.0 |

FIG. 4D

METHOD AND SYSTEM FOR WELDING RAILROAD RAILS

INCORPORATION BY REFERENCE

Through the years, a tremendous development work has been devoted to joining spaced railroad rails by using a welding process to fill the gap between the end walls of spaced rails. Assignee of the present application has patents Morlock U.S. Pat. No. 5,773,779 and Morlock U.S. Pat. No. 5,877,468, which patents are incorporated by reference herein as showing background information. These patents relate to an electric arc welding method and system for joining the ends of two spaced rails utilizing a backing plate between the flat bases of the rails so that the root pass, or first weld bead, is deposited on or as a part of the backing plate. These two patents disclose the total welding process as including a series of vertical layers above the root pass containing metal that fills the gap between the end rails. Details of the welding process, where an electric arc welding torch is moved along a path to create a series of vertically positioned layers of deposited metal, need not be repeated. A robotic mechanism moves the welding torch by a normal robotic program causing the torch to trace the desired path. This path changes between the base, web and head of the adjacent rails forming the gap. Also incorporated by reference is prior copending application Ser. No. 356,837, filed Jul. 19, 1999.now U.S. Pat. No. 6,201,216 B1. This prior application discloses the welding procedure for the root pass used in joining two spaced railroad rails, where the root pass is created by the welding torch moved by a robotic mechanism. A software program causes the torch to trace a desired path, which path is controlled by welding events occurring during the deposition of the root pass. This application is basically directed to the first vertical layer in the lower base portion of the joint or gap being filled. The present invention performs the method set forth in the prior copending application and continues the welding process for total filing of the gap in accordance with a background computer program operated in parallel or simultaneously with the movement controlling robotic software program.

The present invention relates to a method and system for welding the spaced ends of rails and more particularly to welding two spaced railroad rails by using an electric arc welding process.

BACKGROUND OF INVENTION

The narrow gap between facing end walls adjacent first and second railway rails must be filled accurately and rapidly with molten metal if an electric arc welding process is to be successfully used in the field. To accomplish this objective, technology has advanced to the concept of moving the electric arc welding torch back and forth in the gap by a robotic mechanism. In the past, the movement of an electric arc welding torch is controlled by a robotic mechanism by use of an executive software program using somewhat low level language. The program is created by moving the torch in the desired path and recording this movement in program language so that the movement can be duplicated when the next rail joint is being filled. The creation of a computer software program for controlling the movement of a robotic mechanism has resulted in somewhat unsuccessful welding procedures that demands a substantial amount of operator attention. When an executive program is generated by moving a torch in the gap and periodically storing the movement by a software program, difficulty has been experienced when using the program in the field to weld a joint. The narrow gap between the rails is not uniform from one joint to the next and is not ideal for any joint. The gap is formed in the field by a rotary cutting wheel slicing off the end of one rail and then the end of another rail. These rails are then positioned to define the gap. These roughly cut rails are positioned by less than a precise procedure. The two end surfaces are not necessarily parallel. The program heretofore used for moving the arc welding torch for filling the gap has been fixed and based upon ideal positioning of the end walls and a precise spacing of these walls. Consequently, robotic control and automatic welding of the gap between spaced rails in the field has not been universally successful from one gap to the next. The limitation in the past has been the use of a computer software program which is based upon ideal movements of the torch in an ideal, but imaginary, gap. Hopefully the ideal gap is close to the actual gap being filled during the arc welding process. An unsuccessful filling operation results in a rejected joint. In the field often such rejection involves rerouting trains to avoid the work area where the joint is being filled. This is unacceptable and somewhat mitigates against successful implementation of a computer controlled robotic mechanism for filling the joint between spaced rails. The spacing of the end wall is not always the same; consequently, use of an ideal torch movement is not always successful in providing a satisfactory weld joint.

THE INVENTION

The present invention relates to the development of a programming concept wherein a low level language or software program, normally associated with robotic movement controls, is used in parallel with a background, high level language, such as KAREL, by using a unique method for controlling the movement of the electric arc welding torch. The invention involves the creation of a fixed data file, or text file, which involves a series of positions defining the total welding process for filling the gap between the rails. This text file or data array is like a spreadsheet wherein a series of positions are fixedly set in the data array in a manner that each position is defined by a set of coordinates that specifically indicate the position in which the torch is located for the welding process. Each fixed position information includes the welding parameters, such as voltage, travel speed or delay at end of movement associated with a position. The parameters are executed as the torch moves in a preselected path toward a known next position. When the path has been completed and the torch is ready to execute such next position, information relating to the next position is outputted and processed so that a series of individual positions are processed to constitute the total filling procedure by the electric arc welding torch. Each position recorded in the spreadsheet format of the data array is assigned to a specific vertical layer of deposited metal for the welding process. A number of positions are executed in series to produce a layer of fill metal. At the end of the implementation of one welding cycle corresponding to a specific position, the high level background software program senses and determines the vertical height, or z coordinate, of the welding process. If this sensed z coordinate does not correspond to the next position to be cycled from the spreadsheet, the z coordinate of the next position being processed is modified. Indeed, stored z coordinate is replaced with the sensed z coordinate. In the welding process, successive layers are deposited. Some of these layers are to be repeated, if not fully filled. If the position being processed is at the end of a specific layer of molten metal which must be filled, the z coordinate or height of the electric arc welding torch is compared with a known height for the specific layer. When the layer has been completed, the next layer is processed. If the layer is not completed, the positions making up the short layer are repeated. Consequently, a fixed series of welding steps assigned to a metal layer are processed seriatim and, then the vertical height of the welding torch is measured to determine whether the next layer is to be processed. The procedure of outputting a series of fixed stored welding steps identified by the specific orientation of the torch and the layer being processed has proven to be successful. Adjustments are made based upon the actual height of the torch after certain welding steps. Consequently, an aspect of the invention is the use of a spreadsheet type fixed data array or text file, which file has data that can be outputted as one position then another position, each position constituting the orientation of the torch and the particular layer being filled as the torch moves. The implementation of each welding step as individual positions, uses a low level robotic executive software program. At the same time a high level program is used to sense the vertical position of the torch for creating digital information indicative of the actual vertical height of the torch. The height, or z coordinate, can be used to modify the position of the torch at the start of a given welding step.

The data array is created for welding an ideal gap, which gap geometry is not found in the field. Consequently, in accordance with another aspect of the invention, the high level computer program software language is used to create "user frames" that are reference planes indicative of the actual end walls of the spaced rails being welded. The reference planes form the narrow gap to be filled. In accordance with this aspect of the invention, a stylus or other known mechanical device carried by the torch is moved to selected points on one of the end walls. The relationship between the home position of the robot and the selected first point is read and recorded as x, y and z coordinates of the first point. Thereafter, the x axis is measured by moving the stylus to a second point. The x, y plane is determined by selecting a third point by the stylus. The three spaced points on the surface of the end wall define a reference plane that is calculated by the background software program. This reference plane is a "user frame" representing the actual plane of the end wall surface. This same procedure is performed on the other end wall so that a user frame, or reference plane, is calculated for each of the two end walls. These end walls may not be parallel, either vertically or horizontally. By calculating the reference planes of the actual end walls, the actual gap is defined. A plane in the middle of the two reference planes is calculated by the background program. This middle user frame is equidistance from each end wall planes.

When utilizing the invention, the data array or text file is created for a specific gap to be processed in the field. This fixed data includes a large number of individual positions having coordinates based upon spacing and positional relationship with a created reference plane or "user frame". Each position stored in the data array is associated with a preselected vertical layer of molten metal being deposited during the filling process. One novel aspect of this fixed data array is that the location of the torch is oriented with respect to a reference plane calculated in the field, just before each filling procedure. Consequently, in the field the reference planes for the actual end walls are determined by a stylus and calculation employing the background software program. Consequently, reference planes created by the KAREL program define the actual position of the torch at any given time based upon the actual gap being filled and not upon the theoretical gap used in creating the ideal gap of the fixed data array. When each welding cycle defined by a position in the data array is processed, the height of the torch is sensed. The actual z coordinate is used for a welding process defined by a position. When processing the last welding step or position in a given layer of molten metal, the sensed height of the torch is used to determine whether the layer has been filled. If the layer has not been filled, and it is a layer that should be repeated, the welding process constituting the layer is repeated. The height is then again compared with the height of the layer processed to assure a complete fill of this specific layer.

By using both a low level robotic execution software program and a high level background program, the ideal welding process permanently stored in the data array is modified according to actual welding conditions to accommodate variations in the gap and in the welding process. By using a data array with preselected set steps, or positions, any one step can be modified or replaced without completely rewriting the program. The use of the concept of individual positions associated with specific vertical layers of metal allows changes in specific areas. This is a substantial advance in the arc welding process for welding the joint or gap between spaced railroad rails.

By using a standard robotic executive program to control movement of the welding torch, together with a high level language, such as KAREL or Val II as the background software program, there is more control over the robot and the I/O during robotic motion. The background program runs simultaneously with the low level robot motion program so that the background program performs calculations as the robot program actually causes the motion of the torch from position to position. This concept is possible by using a control program, such as Val II, KAREL, or other such high level program language. The computer being used for implementing the robot program and the background KAREL calculation program does not form a part of the present invention.

In accordance with the present invention there is provided a method for automatically filling the narrow gap between facing end walls of adjacent first and second railway rails by depositing vertically spaced layers of molten metal in the gap with an electric arc welding torch using a robotic mechanism. This mechanism moves the torch in a path having a pattern determined by a low level robotic executive program. The torch moves from one spatial position to a next spatial position. The method comprises use of a data array for a specific gap. This data array defines an ideal gap and includes a series of positions making up the idealized progression of the torch as it fills the gap in vertically spaced metal layers. Each positions is identified by the location of the torch defined by at least four coordinates, such as x, y and z, together with the rotational coordinates for these axes. The layer is also fixed in the data array. The data array contains the welding parameters to be executed until the next torch position is reached. Consequently, the data array constructed in accordance with the present invention includes a series of positions indicative of the position of the torch and the molten metal layer being processed. The welding pattern performed during the welding step associated with a given position is also stored with the position being processed. The data from the array is outputted for a specific position. The welding parameters for that position, as stored in the data array, are processed using the robotic executive program. Thereafter, the next position of fixed data is outputted and processed by the robotic executive program. This technique of repeating the processing of given selected positions and welding parameters fixed in the data array continues until the total filling process has been completed. By using this method, the data array can be modified individually without rewriting the total program. By using the spreadsheet concept it is possible to utilize a parallel or background program for modifying the individual welding steps. The use of the spreadsheet or data array to provide a fixed series of welding steps is novel in the art of filling the gap between the ends of railroad rails.

By using the background program, the fixed welding steps in the spreadsheet or data array can be continuously updated based upon sensed parameters primarily associated with the vertical height of the torch during the welding process. In accordance with this aspect of the invention, the vertical height or z coordinate of the torch is sensed at the end of the welding step associated with a position. This is prior to implementing the next position. The actual sensed vertical height is used to modify the position of the torch for the next welding step. Indeed, in practice the sensed height, or z coordinate, is used in processing the next position. This change in the z coordinate is accomplished by the background KAREL program which calculates the actual z coordinate while the robot program implements the welding procedure. At the end of a welding step associated with a specific layer of molten metal, the vertical height of the torch is compared to the vertical height of the layer being filled. If the layer has been filled, the next step or position is implemented. If the layer has not been filled and the layer is one that should be repeated, the prior welding process is repeated to fill the layer. Each welding step starts with the torch in an orientation determined by the data in the specific position of the data array. If the process has completed a layer, or the layer is one that is not repeated, the next position is implemented. In practice, the layers that should be repeated are layers in the lower vertical portions of the base, the web and the head portion of the gap. Other areas of the gap do not repeat a layer.

Since the data array is created in the shop based upon a theoretical gap, the positional information in each step of the data array is associated with a "user frame" or reference plane and not with respect to the home position or point of the robot. The background calculating program is used in the field to create "user frames" or reference planes to provide the orientation for the torch in the actual gap. In the invention, the torch orientation is not with respect to the home position or home point of the robot. The invention uses reference planes predicated on the actual end walls of the spaced rails being welded. To accomplish this, the background program records the special location of a first point on the inner wall of the first rail. A second point on the end wall of the first rail is then recorded. Thereafter, a third point is recorded on the same end wall. By providing the x, y and z coordinates for all three points on the surface of the end wall, a reference plane is calculated. The same process is used for the other end wall. The two reference planes are created before implementation of the welding process. These planes or "user frames" are invariably not parallel. If the spacing between the user frames exceeds a certain amount, such as 0.250 inches, the welding process is discontinued. The actual reference planes or user frames are the starting location in each position of the data array. These planes are used to orient planes for the x, y, z axes of the torch at the start of each step of the welding process. The x, y, z axes and the rotational coordinates of these three axes identify the position of the torch as it starts a welding cycle. This cycle then follows a preselected path to the next position which is defined from the data array. The new cycle is then implemented.

In summary, the welding process is defined in a fixed data array or text file. Each welding position starts with the position of the torch with respect to a given user frame. In the field, user frames are created before the welding process by using the background program. These planes are used to implement the positional control of the torch. In this manner, a series of vertical metal layers are filled. Substantial metal is deposited in layers forming the base area. Very little metal is deposited in layers in the web area. These web layers are repeated if not filled. The head includes a series of vertical layers as clearly illustrated in the various patents incorporated by reference herein. Filing of these layers is repeated if the layer is not filled when processing of a set of positions defining the weld path for the specific layer.

The primary object of the present invention is the provision of a method and system for automatically filling the narrow gap between facing end walls of adjacent first and second railway rails, which method and system utilizes a spreadsheet concept of a series of welding steps, which steps may be modified or rewritten to define a specific welding process for a particular gap.

Another object of the present invention is the provision of a system and method, as defined above, which system and method can be used in the field to accommodate a variety of deviations in the gap from an ideal gap geometry.

Yet another object of the present invention is the provision of a method and system, as defined above, which method and system utilizes both a robotic control program and a background calculating program to implement the movement of an arc welding torch in a preselected path and to modify the path based upon variations in the welding process used in filling the gap.

Still another object of the present invention is the provision of a method and system, as defined above, which method and system allows robotic control of the welding torch in an arc welding process for filling the gap between the ends of railroad rails, where both a preselected fixed welding procedure and an interactive calculation process causes the welding procedure to be implemented properly irrespective of variations in the process.

These and other objects and advantages will become apparent from the following description taken together with the accompanying drawings.

THE DRAWINGS

FIG. 4 is a table illustrating schematically the text file concept employed in the present invention;

FIGS. 4A–4D are tables constituting actual text file or data arrays used in practicing the present invention;

PREFERRED EMBODIMENTS

Figure 1:
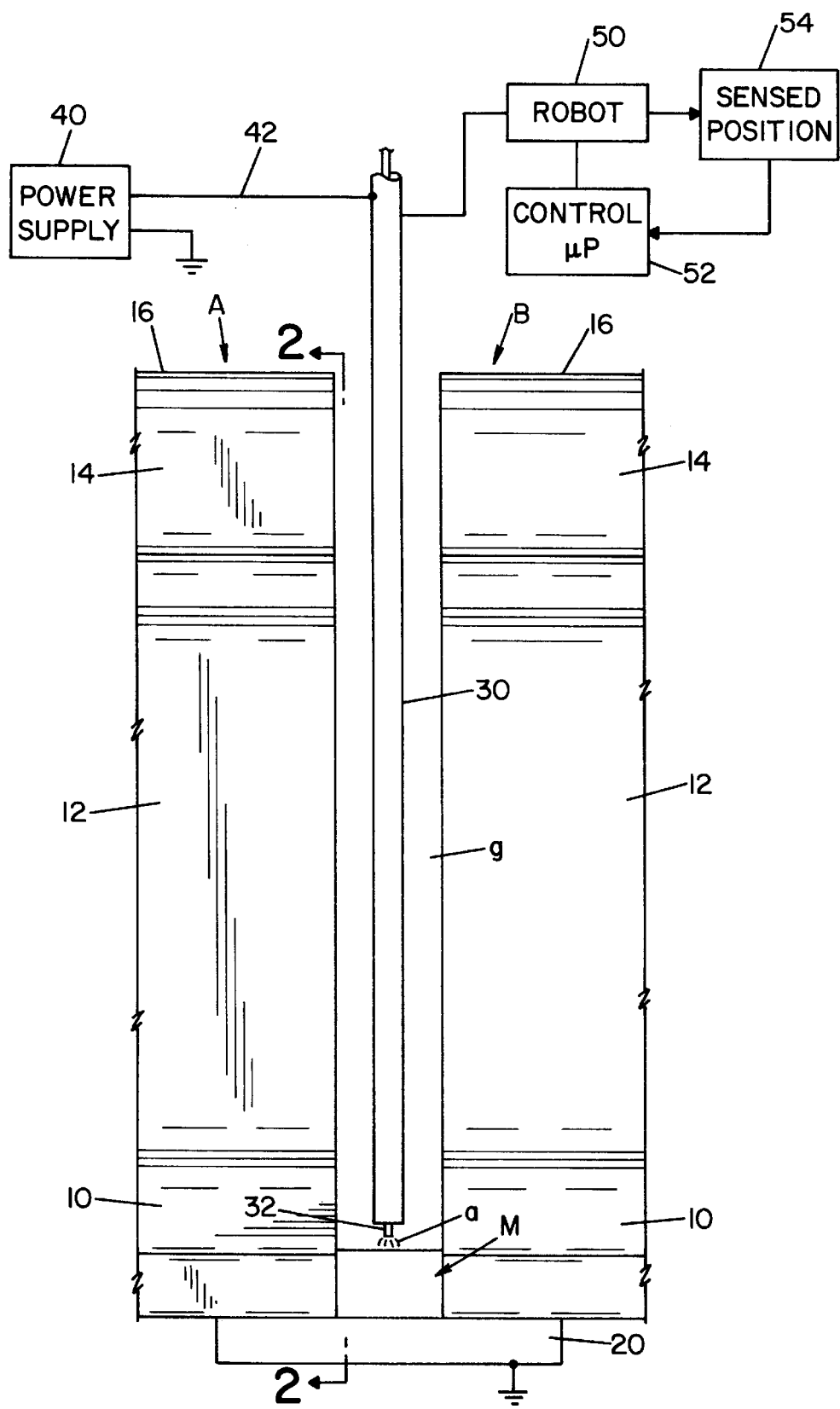
FIG. 1 is a schematic side elevational view of the gap to be filled using the present invention, together with a block diagram showing the components of a robotically controlled welding system employing the present invention.
Figure 2:
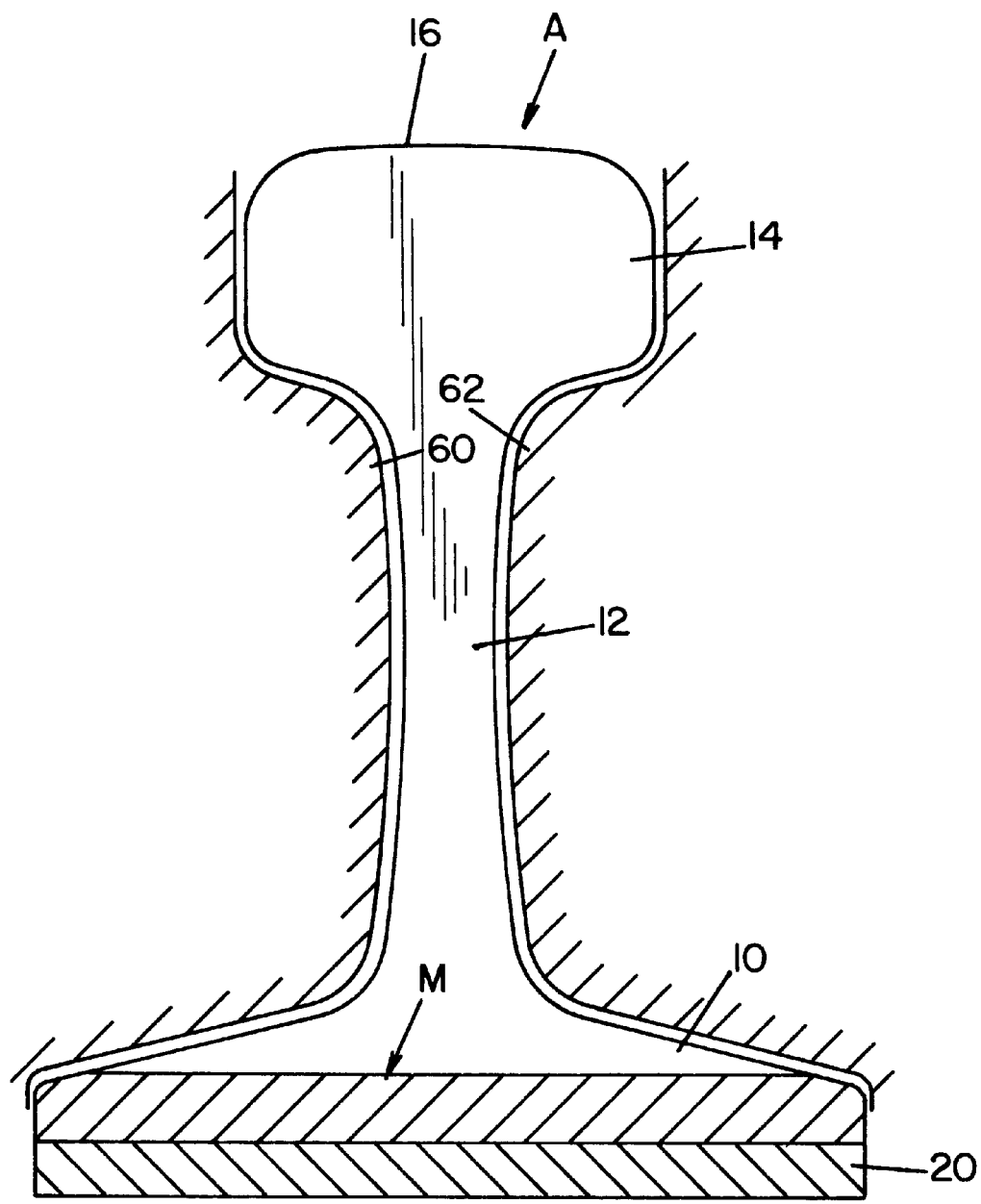
FIG. 2 is an enlarged cross-sectional view taken generally along line 2—2 of FIG. 1.
Figure 8:
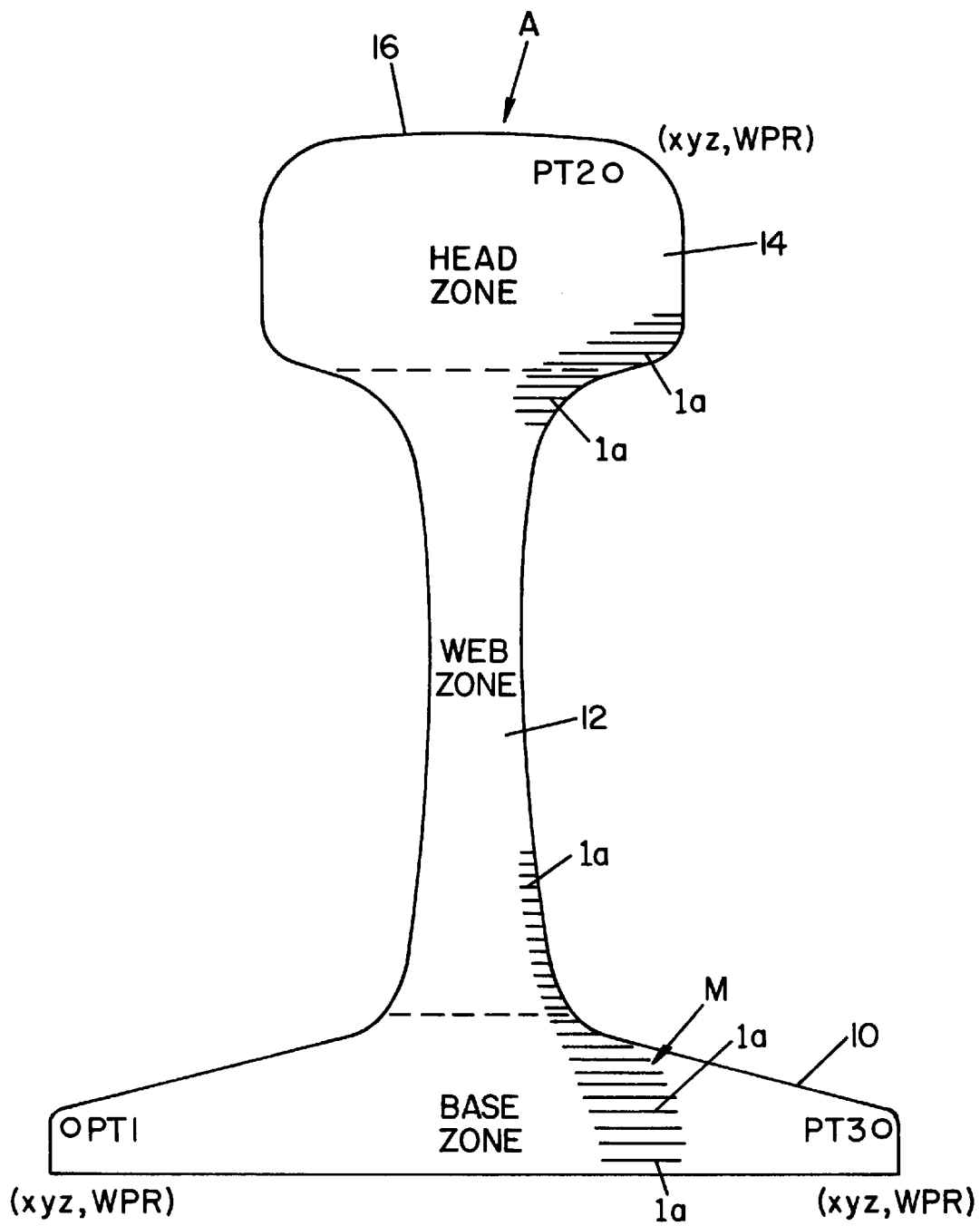
FIG. 8 is an enlarged view showing the end wall of the rail with the points used in constructing the user frame and illustrating the vertically spaced metal layers used to identify and control the welding process to fill the gap between the two railroad ties.

Referring now to the drawings wherein the showings are for the purpose of illustrating a preferred embodiment of the invention only, and not for the purpose of limiting same, FIGS. 1 and 2 show railroad rails A, B, each having a standard base 10, web 12, head 14, and upper cap 16. To create electrical continuity for the arc welding process, spaced rails A, B, are grounded together by backplate 20, which closes the lower portion of vertically extending gap g. This gap is filled by an electric arc welding process as described in Morlock U.S. Pat. No. 5,773,779 and Morlock U.S. Pat. No. 5,877,468 whereby molten metal M is deposited in gap g by a torch 30 through which is advanced a welding wire or electrode 32. A standard power supply 40 has a lead 42 electrically connected to torch 30 for creating the voltage between electrode 32 and the molten metal puddle or bead M. In accordance with standard welding technology, the voltage between electrode 32 and metal M causes an electric arc a, which arc melts electrode 32 as it is advanced to metal M for depositing more metal. In accordance with known practice, torch 30 is moved from position to position across gap g by a standard robot mechanism 50 to form vertically spaced metal layers, illustrated as layers la, as shown in FIG. 8. The layers are also disclosed in Morlock U.S. Pat. No. 5,773,779 and Morlock U.S. Pat. No. 5,877,468.

As torch 30 is moved from point to point across gap g, a layer of molten metal is deposited over metal M. The succession of layers are repeated with different types of welding procedures tailored to each of the particular layers being deposited. The weld procedure disclosed in the previous Morlock patents does not form a part of the present invention and need not be explained further. Robot 50 moves torch 30 back and forth across gap g to progressively add layers of metal in the gap. The path traveled by the torch is physically controlled by robot mechanism 50; however, details of the path constituting a series of positions along the path is determined by the executive movement program. The movement program is an integral part of the robotic mechanism and is executed by an appropriate on-board computer, such as a microprocessor 52. Such device is provided with modem robot mechanisms. In practice, a robot 50 moves torch 30 back and forth in accordance with a standard low level movement executive program provided with the robot. To create the movement program, torch 30 is moved from position to position. The spatial locations of the positions are recorded and memorized by the executive program. To perform the welding process, the memorized or recorded positions are repeated in accordance with standard robotic technology. In standard robots, the movement is recorded and then duplicated by execution of a low level movement executive program. The robot performs the same movements during each welding process. The present invention utilizes a KAREL background program which is high level language that is performed and executed in parallel with the standard robotic program. The present invention provides calculations and sensing programs to sense the welding condition as the robotic program moves torch 30 and, as explained later, modifies the existing movement program in accordance with the various positions encountered when filling gap g. In the field rails A, B are positioned at a precise spacing to define the gap g. Thereafter, copper shoes 60, 62 are moved inwardly to close the lateral sides of gap g, as shown in FIG. 2. Before shoes 60, 62 are closed, base 10 is welded by moving torch 30 back and forth between the base portions of the rails in accordance with standard welding technology. Metal M is progressively deposited in the base area. As the welding process progresses upward to web 12, the shoes are closed and remain closed during filling of the web portion of gaps by back and forth movement of torch 30. As so far described, the welding process is not different than the prior process illustrated in the Morlock patents, except that Morlock does not teach the use of a background high level program to communicate with the low level movement program of the robot unit.

The invention relates to a program which controls the movement of torch 30 to fill gaps wherein a background high level logic, such as KAREL, is used to modify or change previously loaded data used to move the torch with a standard robot program. In accordance with the invention, there is provided a text file or data array 100 shown as a part of the program disclosed in FIG. 3. A spreadsheet format shown in FIG. 4 is used for the data. Details for the data developed for a specific gap is shown in the table divided into the sections shown in FIGS. 4A–4D. The invention involves fixedly storing the exact orientation of torch 30 at the start of a welding step indicated as a "position". A succession of positions constitute the total filling procedure for gap g as shown in the table of FIGS. 4A, 4B. The position of the torch is stored as a set of coordinates. In practice, these coordinates are x, y, and z, together with the rotational coordinates of the points. The rotational coordinates are W, P, and R, respectively. Each position has a precise orientation for the starting point of the torch, together with stored welding parameters used for welding from the position toward the next position. The stored data also includes the user frame with which the coordinates are oriented in the actual gap. As will be described later, a reference plane or "user frame" is the actual surface of the end of a rail, either the front rail A or back rail B and is created before the weld process is started. By orienting the torch at a starting position with respect to a user frame, the actual gap is processed instead of some theoretical or ideal gap corresponding to the stored data. Data stored in the text file or data array 100 includes the layers la, of which a position is a part. In summary, each line or welding step stored in a series of steps in text file 100 includes the exact orientation of a torch from a reference plane or user frame created in the field. In practice, user frame 3 is one rail end and user frame 4 is the other rail end. These user frames are unique for each joint being processed. They are calculated by the background program prior to each welding operation to fill gap g. By using a spreadsheet concept or similar data array, the welding process is modified by merely changing one of the individual welding steps. Several positions are processed to produce a given level 1a. As shown in FIG. 4A, 14 separate positions are used to create layer 3. In the smaller areas of the gap, such as the web area, a fewer number of positions are used for a layer. The torch is oriented with respect to one rail (user frame 3) and then with the other rail (user frame 4). This flexibility provides improved accuracy for the welding process. To change any one of the several steps or positions in the data array, the information is merely modified without rewriting the whole data array. Consequently, a stored fixed data is available for each gap to be welded. If the gap is for a certain rail with a certain spacing, the text file 100 is for that particular gap.

Figure 3:
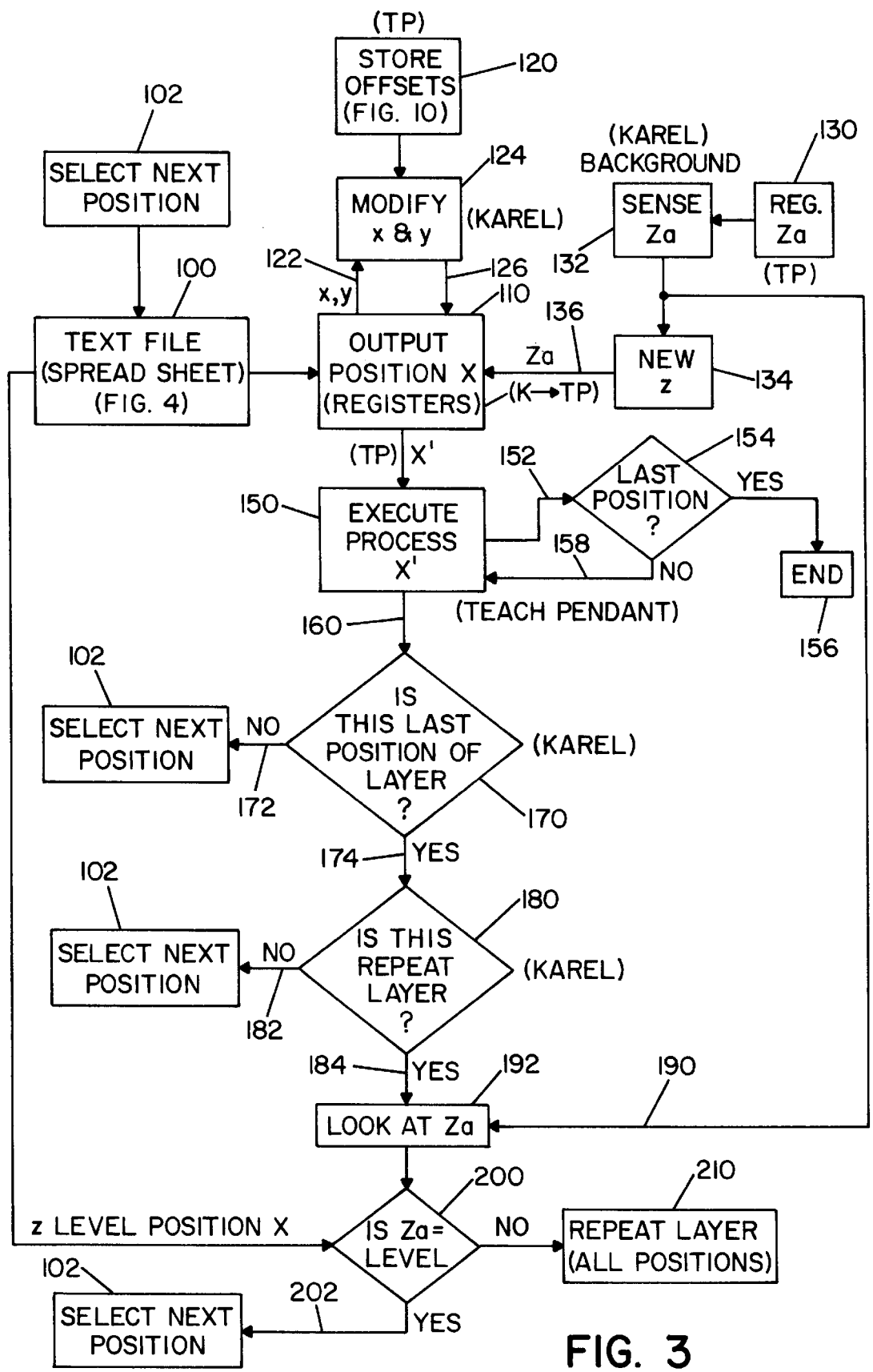
FIG. 3 is a flow chart illustrating the software program constituting the preferred embodiment of the present invention as implemented by a microprocessor or computer incorporated into a robotic control mechanism.
Figure 10:
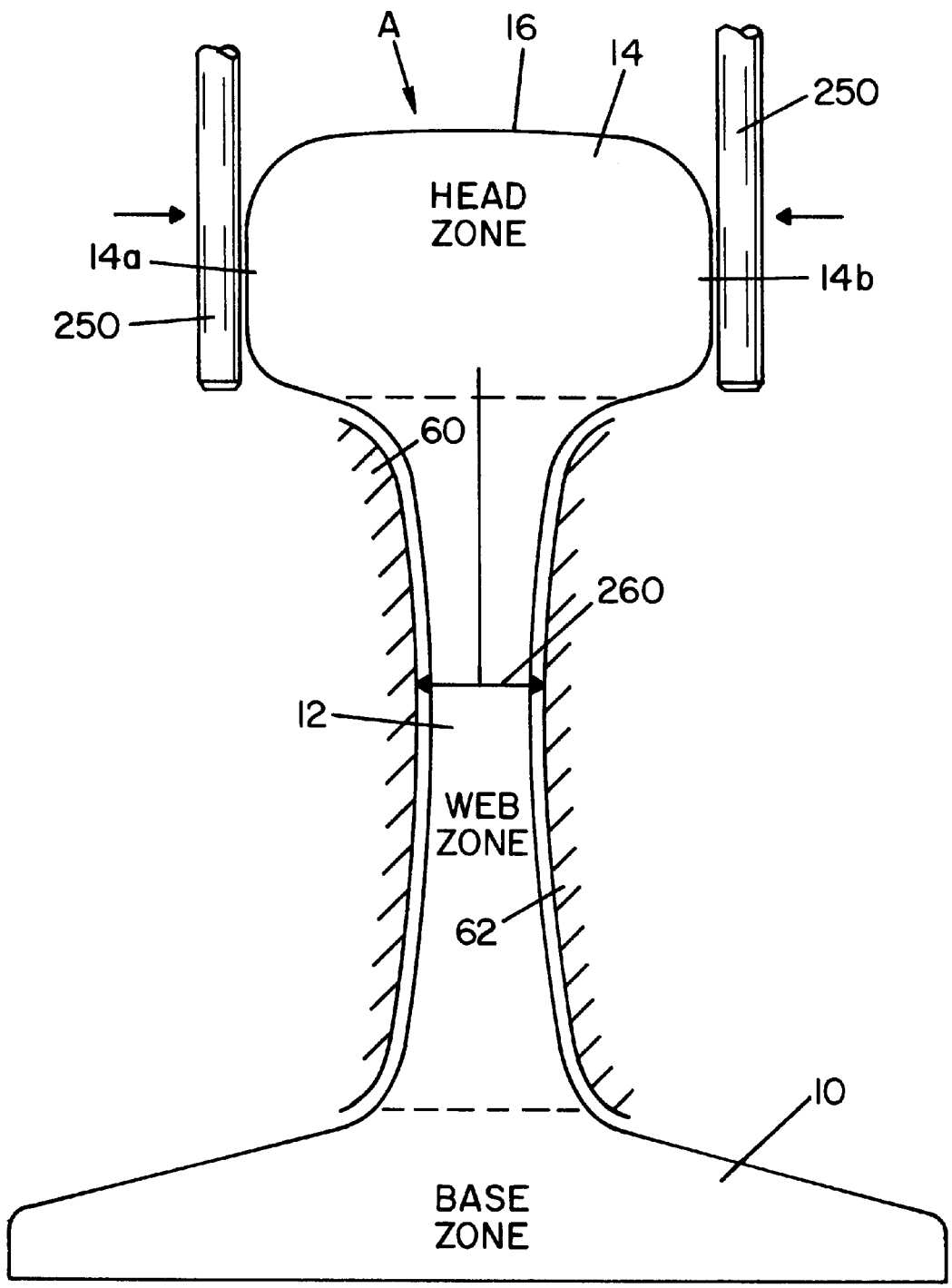
FIG. 10 is an end view similar to FIG. 8 illustrating the stylus used for determining offset dimensions for the rails being processed by the present invention; and, FIG. 11 is a flow chart illustrating the software program implementation for creating the user frames and offsets in accordance with an aspect of the present invention.

By using the KAREL background program, each welding step or position is modified to adjust the welding process to conditions experienced in the field. As shown in FIG. 3, the program allows the various positions to be outputted in succession by a command from "select next position" routine 102 so that the information is stored in machine logic registers 110 controlling the normal robot movement program. The various positions are outputted in succession from the text file or data array illustrated in spreadsheet format in FIG. 4. However, in accordance with an aspect of the invention, the background program is used before the gap filing operation. As indicated in FIG. 10 the program determines the lateral offsets of head 14 and web 12 in the x, y direction. The offsets are measured laterally from the center of base 10. The amount of measured offset for each layer 1a, is stored as indicated by block 120 before the welding process starts. During the subsequent welding process, the background KAREL program reads the stored x, y coordinates as indicated by line 122. These distances are modified by the stored offsets in block 124 of the program. The new x, y coordinates including the added offsets of the particular rails are being processed. These x, y values are reloaded into registers 110, as indicated by line 126. Thus, the positional information is loaded into registers 110 for normal processing by robotic mechanism 50 shown in FIG. 1. The x, y coordinates are subject to lateral offsets, which are measured and stored in block 120 before the weld process is started. These offset dimensions are used to modify the x, y coordinates for ultimate use by the robot using standard Teach Pendant program T P available on most robots. Offsets are fixed for the whole welding process of gap g. Movement of the torch in the x, y directions remains fixed throughout the welding process with a measured offset.

The z coordinate representing the vertical height of metal M and, thus, the vertical height of torch 30, changes for various positions. Since the molten metal does not accumulate in the vertical direction in a consistent manner, the z coordinate has presented the most difficulty. Without a background program to compensate for variations in the vertical height of the torch, certain imperfections may be experienced in filling the gap g. The z coordinate, in accordance with the present invention, is sensed at most, if not each position as shown by the software program elements in FIG. 3. The standard robot program loads the actual z coordinate Za into register 130. This register can be integrated to sense the vertical height of metal M at any time during the program. By using the present invention, the vertical height or z coordinate in register 130 is sensed by the KAREL program so that the actual vertical height indicated by block 132 is outputted in KAREL variables into the subroutine 134. This new z coordinate is used to replace the coordinate-in the text file, as indicated by line 136. The new coordinate, in KAREL variables, is converted to Teach Pendant variables and then stored in the registers 1 10. Consequently, the position to be processed by the standard robotic executive program has an x, y, and z coordinate which includes the offsets for individual rail configurations and the vertical height or z coordinate representing the actual height of metal M in gap g. Registers 110 are now loaded in TP language for movement of torch 30 using the robotic mechanism 50. Each position is successively modified by adding x, y offsets and replacing the z coordinate. Processing of steps is indicated by block 150. In accordance with the present invention, the standard robot motion program is used to execute each successive position. In accordance with the present invention, the background program modifies the x, y, and z coordinates for position x. The robot merely responds to its standard program. The difference is that instead of processing stored coordinates of position X, the program processes the new coordinates for position X'. All steps are processed by the standard TP program until the total gap is filled. A variety of program techniques are used to determine the last weld step or position. In the illustrated embodiment, the identity of the position being processed by the TP programs is directed through line 152 to decision routine 154. If the last position is being processed, the program of FIG. 3 is ended as indicated by block 156. Otherwise, line 158 causes the process or software program to continue as indicated by data on line 160.

Several positions are processed by executive program 150 to form a layer 1a. At the end of each step designated or associate with a layer, the welding parameters have been processed and the position number is fed from line 160 to a decision routine 170 in KAREL language. If the position is not the last step or position for a given layer, the "select next position" routine 102 is implemented from information on line 172. If the position is the last for a given layer, such information is outputted on line 174 to the decision routine 180. Routine 180 is activated to determine if the completed layer is one which should be repeated if not filled. In the welding process, the layers in the web 12 before the end of the web are to be repeated if they do not form fill completely. In the area between the web and the head, the layers are not repeated. These have a substantial amount of metal being deposited and the height is not critical. The head fill is very important. Levels in this area are repeated, if the layer has not reached the vertical height determined by the last position constituting the layer for the head fill. The same criteria is true of the cap pass. In that area, several layers are deposited on top of the head to form the uppermost contour of the joint. This vertical height must be obtained for the purposes of grinding the rail to the desired dimensions without leaving cavitations or imperfections. If the layer is one which is not to be repeated, then data on line 182 activates the "select next position" routine 102 for the next welding step. If the layer just processed is one that should be repeated if the vertical height is not proper, information on line 184 is outputted to look at the actual z coordinate Za on line 190 at block 192. The actual z coordinate Za as measured by the background program at block 132 is compared with the z coordinate for position X' having been just processed. This comparison is made by decision routine 200. If the actual z coordinate is too low, all positions constituting the unfilled layer are repeated as indicated by the command block 210. If the level of the metal M is proper, this information is available on line 202 to activate the "select next position" routine 102. The preferred embodiment of the present invention utilizes the program set forth in FIG. 3 to end the program at block 156. This is the broadest aspect of the invention. In accordance with a limited aspect of the invention, the information on line 160 is processed further. The background program for sensing the vertical height of metal M is used to assure that this metal reaches a prescribed level at certain areas of the filling process. In practice, the total program is employed for processing the gap even though the program has been used without software processing beyond the TP movement at block 150.

As indicated above, a basic aspect of the invention is use of a text file 100 as is illustrated in a spreadsheet format in FIGS. 4, and 4A–4D. In FIG. 4, the coordinates x, y, and z together with coordinates W, P, and R are stored for each of the weld steps or positions. The parameters being processed from one position to the next are also stored in the data array 100 as indicated by items a, b, and c. A more detailed presentation of the actual data array for a particular gap is illustrated in the single table shown in FIGS. 4A–4D. The root pass is layer 1. It is formed by executing positions 1–4. Above the root pass is layer 2 that shifts from weld schedule 16 to weld schedule 6 and then back to weld schedule 9 as the positions are processed. A weld schedule is a standard robotic table used to set voltage and current. A "weave" is implemented only at position 8. The next to the last vertical column is the speed of the torch as it moves to deposit metal. The last weld parameter in the data array is the end delay. This is the time, in seconds, between the conclusion of a welding process performed at one position and the start of weld process for the next position. Since the welding process continues, the delay is a mere hesitation until the next position. After the first layer is deposited over the root pass, the base is filled by processing points 11–24 as a single layer 3. This layer is repeated for layer 4, which is therefore not duplicated in the illustrated table. After the base fill has been completed, several layers are used to fill the tapered portion of the base. The web fill is a single layer 11 formulated by processing positions 76–81, as shown in FIG. 4C. In this procedure, user frame 2 orients the torch in certain positions. This plane is the imaginary center plane between the two end walls of the rails labeled "user frames" 3 and 4, respectively. Consequently, if the two planes (UF3, UF4) are 1.2 inches apart, the center plane or user frame 2 bisects this distance and is 0.6 inches from each end wall. In some instances, it is more practical to orient the torch position with respect to the center of the gap, as opposed to one of the spaced end walls. The various positions are stored in the data array as set forth in the table of FIGS. 4A–4D. The table data controls the sequence of movement of torch 30 from position to position. If any of the parameters need to be changed, they are changed without rewriting the total data array. The data array 100 controls the movement of the torch through implementation of the standard TP robotic program. In accordance with the invention, the background program is used to modify the existing data array before implementing a specific position or welding step. The data array is formed for a given rail as an idealized gap. Such ideal gap does not occur in the field. Therefore the present invention converts an idealized welding process into a field implemented welding process utilizing the concepts of the idealized system.

Figure 5:
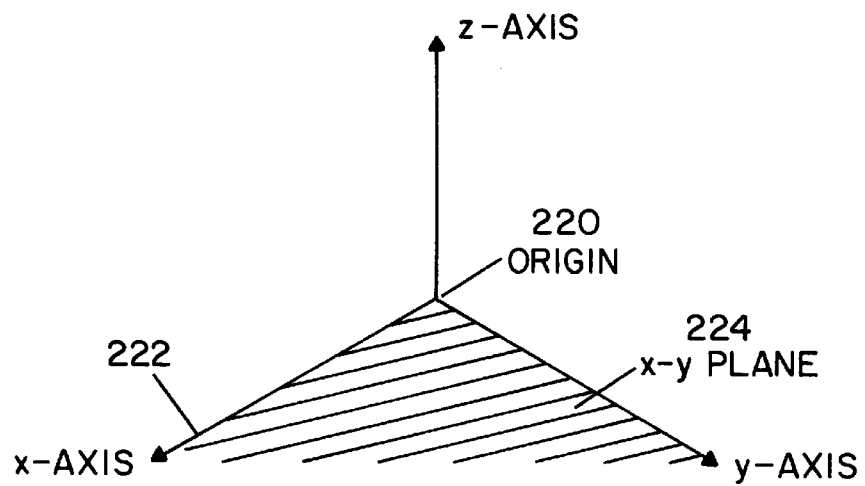
FIG. 5 is a spacial representation of the orthogonal geography and planes used in creating user frames or reference planes in accordance with one aspect of the present invention.
Figure 6:
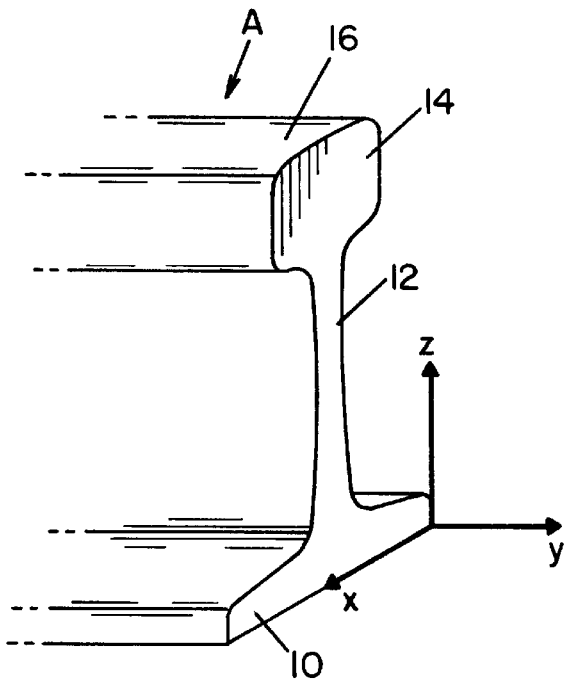
FIGS. 6 and 7 are pictorial views of the ends of the two rails which are to be joined together by using the present invention, together with an orientation of the origin point as shown in FIG. 5.
Figure 7:
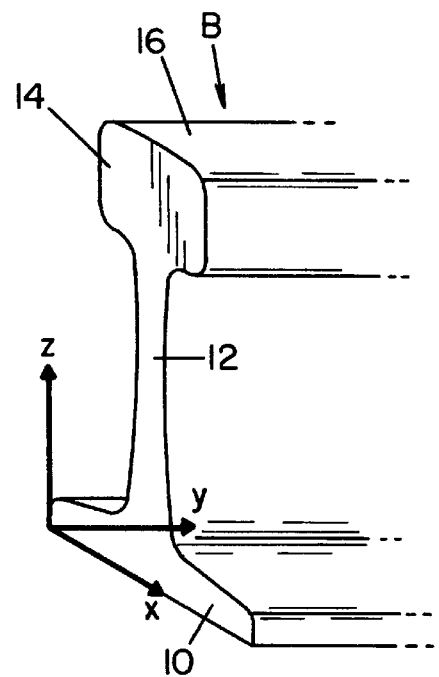
Figure 9:
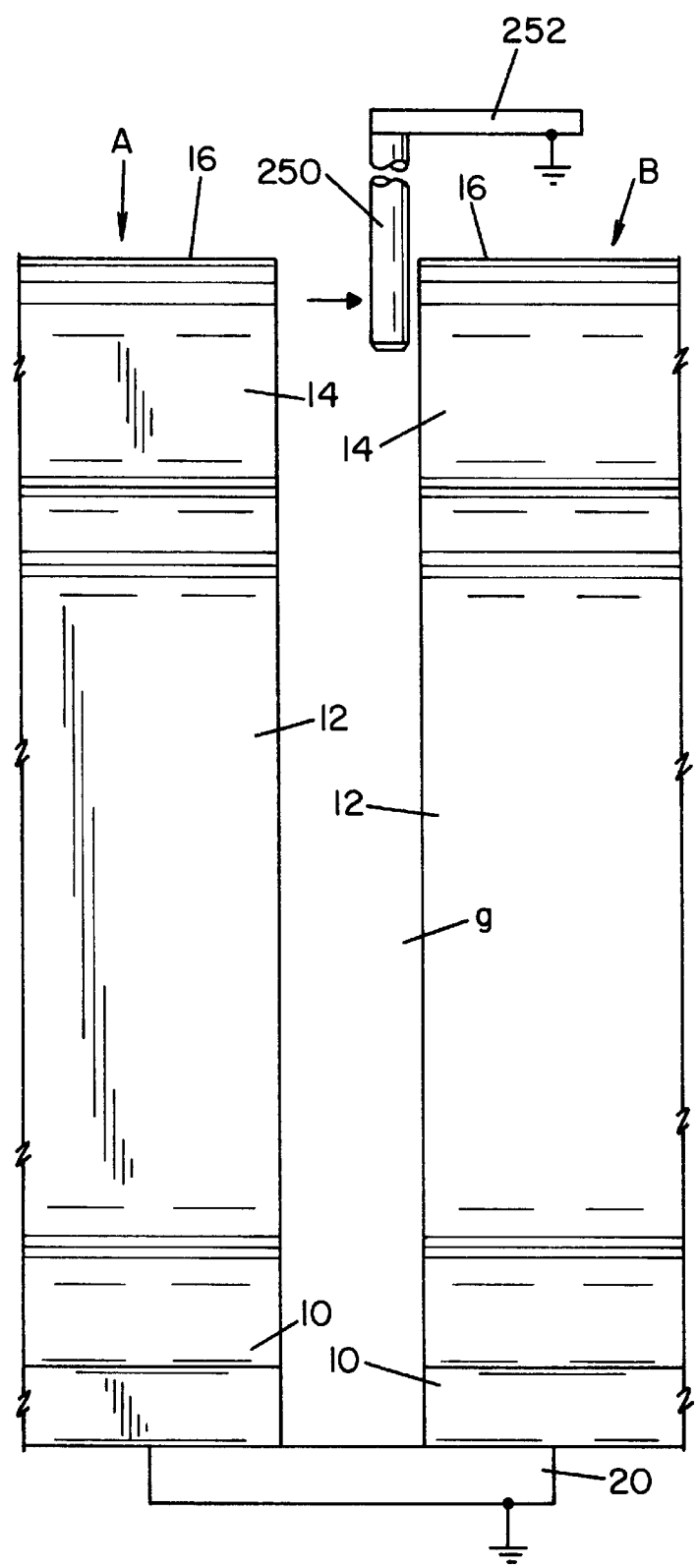
FIG. 9 is a side elevational view similar to the lower portion of FIG. 1 illustrating the stylus employed for creating the user frame by computer software program disclosed in FIG. 11.

Before processing a gap in accordance with the software program set forth in FIG. 3, the user frames or reference planes are determined in the field by the background program. This aspect of the invention is set forth in FIGS. 5–9. As shown in FIG. 5, the user frame is established by creating an origin point 200 at the base of the rails being analyzed. This provides the x, y, z coordinate for the point 220. To determine one orientation for point 220, the x axis 222 is sensed by recording the x, y, z coordinates of a second point. The final determining of the plane is obtained by selecting a point to sense the x, y plane 224. The three points are generally indicated as PT1, PT2, and PT3 in FIG. 8. To generate a user frame associated with the end wall of one of a rail, points PT1, PT2 and PT3 are sensed by moving stylus 250, shown in FIG. 9, to the points shown in FIG. 8. An electrical pick up 252 associated with the torch indicates the location of the three points to generate the user frame. Knowing the radius of stylus 250 and the position of the lower portion of the stylus, each point PT1, PT2, PT3 is read by moving the stylus to the point. The background or KAREL program reads the points with respect to the home point or position of the robot. So far only the background program is being employed. Registers are set to indicate the exact position of points PT1, PT2 and PT3 with respect to the home position of the robot. These points define a plane indicative of the actual end wall of the gap being processed. The orientation is from the end wall and not from the robot home point. This procedure of determining the user frame is repeated for the other rail prior to the welding process. The head 14 and the web 12 often offset laterally with respect to the center base 10. The background program measures the offset of the head by using stylus 250. The stylus is moved to side 14a and then to side 14b of the head as shown in FIG. 10. The distance between these sides is calculated by the background program to determine how far the head is offset from the center of base 10. With copper shoes 60, 62 closed, stylus 250 is also moved downwardly as indicated by arrow 260 to determine the position of one of the shoes. Both sets of shoes are sensed and the distances are averaged to determine lateral offset. This is a measurement corresponding to the lateral offset for web 12. The offset information is calculated and stored for use in block 120 of the program described in FIG. 3.

In accordance with the invention, a particular data array 100 is constructed for each of the several standard rails and gaps to be filled in the field. The fixed data in the text file 100 is available in the field for selection based upon the particular rail to be joined. In the past, robot mechanism 50 was merely oriented and the torch was allowed to follow a pattern generated experimentally. This prior movement procedure involved moving from position to position recorded in the TP- executive program of the robotic unit. Such practice merely employed the existing low level program language of the robot. In accordance with the invention, a standard text file is created for the joint; however, the welding is accomplished in a proactive manner so that the background program calculates, senses and modulates the various processes to be implemented by the standard TP robotic program. To customize the actual welding process being performed, user frames are created by the background program to show the deviation of the end wall surfaces from the ideal gap surfaces used to load the text file. In addition, the lateral offsets of the head and web are to be determined before the filling process. The offsets are added or subtracted from the x and y positions during the welding process.

Figure 11:
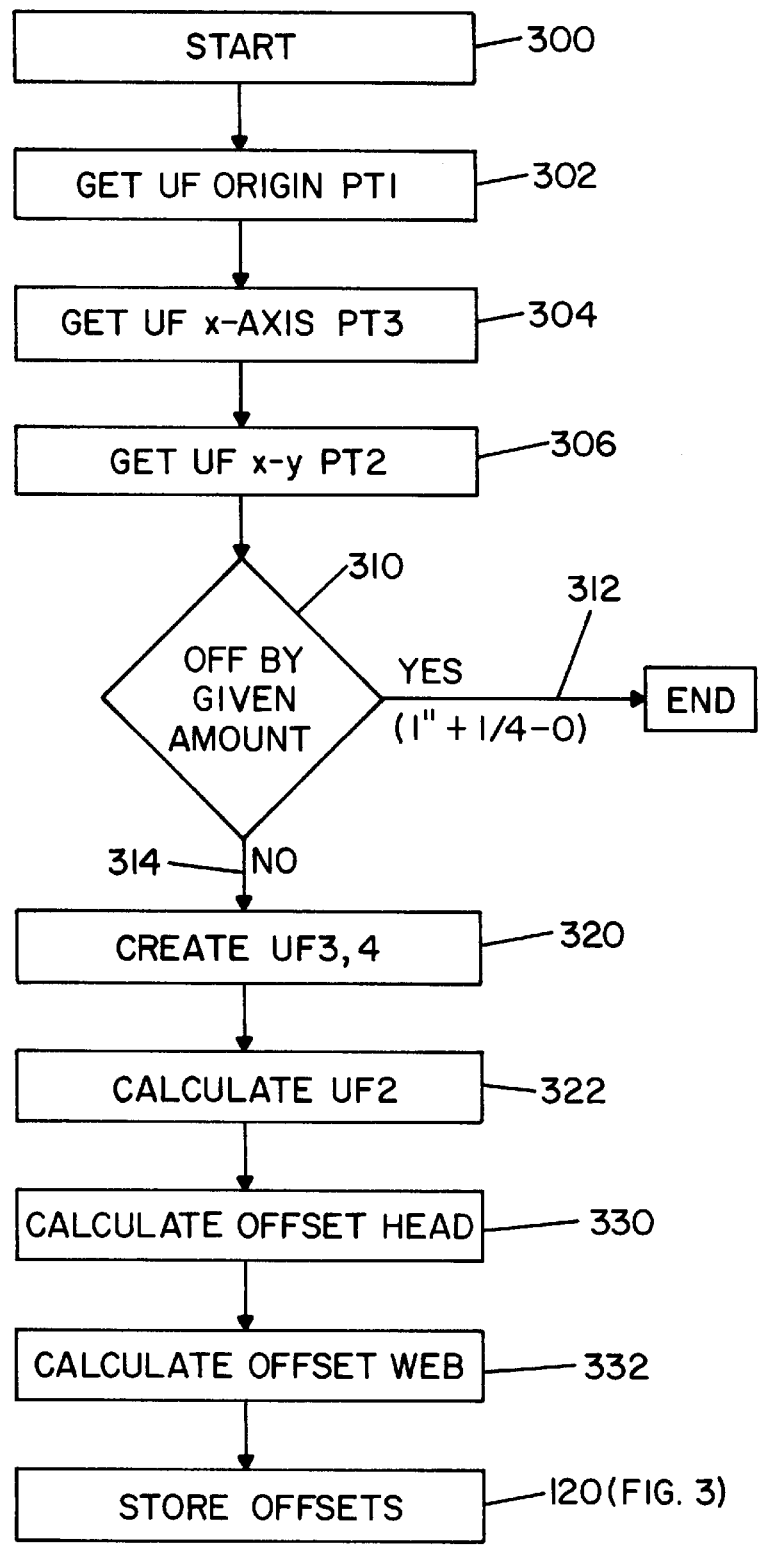

FIG. 11 discloses the program used in the field before starting the welding process. The welding process is initiated by the start routine 300. The background program positions stylus 250 at point PT1 as indicated by box 302. This point is then recorded and the background program moves stylus 250 along the x axis to point PT3. This x axis information and position is then recorded as indicated by box 304. Thereafter, the background program moves stylus 250 to create the x, y plane by recording the position of point PT2, as indicated by block 306. After all of these points for a given reference plane are recorded, corresponding points for the facing rail are also determined. Having the points necessary for calculating the spacing between the user frames, the spacing information is provided to decision routine 310. If the spacing is less than the spacing used to create the ideal gap, the weld process does not take place. If the spacing is more than 1/4 inch larger than the gap, the process does not take place. Each of these conditions is recorded or detected in lines 312 that ends the process. A train must be rerouted around this area so that a new joint can be formulated for welding the rail sections together. If decision routine 310 determines that the spacing is no greater than 1/4 inch larger than the ideal gap, this information is provided in line 314 to block 320. The background program calculates user frames 3 and 4 corresponding to the planes of the end walls of the adjacent rails. Having the end walls which are user frames 3, 4 the middle user frame 2 is calculated by bisecting the two end wall frames. This provides a center plane which is equidistance from both end walls for use in orienting the torch as set forth in certain steps or positions of the data array. This procedure is indicated as block 322. The background program then calculates the head offset as indicated by block 330. The web offset is calculated as indicated by block 332. These offsets are stored in block 120 which is one input of data to the novel program disclosed in FIG. 3. The robotic program records points PT1, PT2, PT3. The background KAREL high level program, uses the point orientations and the offset positions to calculate data added to the data array to perform the method shown in the computer program of FIG. 3.

In practicing the invention, the standard robotic motion program using Teach Pendant language moves the torch from point to point. This standard program can orient the torch with respect to the home position or other manually oriented user frame. Automatically orienting the user frames to the rail face is a novel concept of the present invention and requires the implementation of the background program which communicates with the robotic program and is operated simultaneously therewith. The computer or microprocessor for processing the background program and the robotic program may be separate or combined. The processing of calculations and positional information is standard technology in the computer program art and several programs and concepts can be used for performing these functions. Details and procedures of accomplishing the objectives and programmed steps used in the present invention may be varied. The basic concept of the invention is providing a data array associated with an ideal gap and a background program to modify the orientation of the torch to start each weld step to accommodate an ideal weld without an ideal gap geometry. Further, the invention uses the layer concept where several positions or steps are used to create a single layer.

Having thus defined the invention, the following is claimed:

1. A method for automatically filing the narrow gap between facing end walls of adjacent first and second railway rails by depositing vertically spaced layers of molten metal in said gap with an electric arc welding torch using a robotic mechanism that moves said torch in a pattern controlled by a low level robotic execute program from a spatial position to a next spatial position, said method comprising:

(a) constructing a data array for a specific gap, said array constituting a series of positions making up an idealized progression of said torch to fill said gaps in vertically spaced layers made up of multiple positions, each of said fixed positions identified by at least four coordinates, including (1) at least x, y and z, (2) the layer in which said position is a part and (3) the welding parameters to be executed while said torch moves toward the next position;

(b) outputting data relating to a specific position from said data array;

(c) processing said welding parameters associated with said outputted data using said robotic execute program;

(d) then, outputting the new fixed data relating to the next position in said series of points;

(e) processing said welding parameters associated with said new data using said robotic execute program; and, (f) repeating said outputting and processing acts until said positions in said data array relating to a specific layer have been processed.

2. A method as defined in claim 1 further including:

(g) sensing the actual z coordinate of said torch before said processing;

(h) modifying said z coordinate of said outputted data by said sensed z position; and, (i) then processing said welding parameters with said modified z coordinate.

3. The method as defined in claim 2 wherein said modifying replaces said z coordinate of said data array with said sensed actual z coordinate.

4. The method as defined in claim 3 wherein said sensing is accomplished by a KAREL program.

5. A method as defined in claim 4 further including:

(j) recording the spatial location of a first point on the end wall of said first rail;

(k) recording the spatial location of a second point on the end wall of said first rail;

(l) recording the spatial location of a third point on the end wall of said first rail;

(m) calculating a first reference plane using said first, second and third points on said first rail;

(n) recording the spatial location of a first point on the end wall of said second rail;

(o) recording the spatial location of a second point on the end wall of said second rail;

(p) recording the spatial location of a third point on the end wall of said second rail;

(q) calculating a second reference plane using said first, second and third points on said second rail; and, (r) using one of said planes as the reference of said coordinates during said processing of the data associated with said positions.

6. A method as defined in claim 3 further including:

(j) recording the spatial location of a first point on the end wall of said first rail;

(k) recording the spatial location of a second point on the end wall of said first rail;

(l) recording the spatial location of a third point on the end wall of said first rail;

(m) calculating a first reference plane using said first, second and third points on said first rail;

(n) recording the spatial location of a first point on the end wall of said second rail;

(o) recording the spatial location of a second point on the end wall of said second rail;

(p) recording the spatial location of a third point on the end wall of said second rail;

(q) calculating a second reference plane using said first, second and third points on said second rail; and, (r) using one of said planes as the reference of said coordinates during said processing of the data associated with said positions.

7. The method as defined in claim 2 wherein said sensing is accomplished by a KAREL program.

8. A method as defined in claim 7 further including:
(j) recording the spatial location of a first point on the end wall of said first rail;
(k) recording the spatial location of a second point on the end wall of said first rail;
(l) recording the spatial location of a third point on the end wall of said first rail;
(m) calculating a first reference plane using said first, second and third points on said first rail;
(n) recording the spatial location of a first point on the end wall of said second rail;
(o) recording the spatial location of a second point on the end wall of said second rail;
(p) recording the spatial location of a third point on the end wall of said second rail;
(q) calculating a second reference plane using said first, second and third points on said second rail; and,
(r) using one of said planes as the reference of said coordinates during said processing of the data associated with said positions.

9. A method as defined in claim 2 further including:
(j) sensing the actual z coordinate of said torch after said processing act at the end of the series of points constituting a specific layer;
(k) comparing said actual z coordinate with a value representative of the layer height of said specific layer if said specific layer can be repeated; and,
(l) repeating the processing of the positions constituting said specific layer if said comparison indicates that the actual z coordinate is lower than the desired height of said specific layer.

10. The method as defined in claim 9 wherein said sensing is accomplished by a KAREL program.

11. A method as defined in claim 10 further including:
(m) recording the spatial location of a first point on the end wall of said first rail;
(n) recording the spatial location of a second point on the end wall of said first rail;
(o) recording the spatial location of a third point on the end wall of said first rail;
(p) calculating a first reference plane using said first, second and third points on said first rail;
(q) recording the spatial location of a first point on the end wall of said second rail;
(r) recording the spatial location of a second point on the end wall of said second rail;
(s) recording the spatial location of a third point on the end wall of said second rail;
(t) calculating a second reference plane using said first, second and third points on said second rail; and,
(u) using one of said planes as the reference of said coordinates during said processing of the data associated with said positions.

12. A method as defined in claim 9 further including:
(m) recording the spatial location of a first point on the end wall of said first rail;
(n) recording the spatial location of a second point on the end wall of said first rail;
(o) recording the spatial location of a third point on the end wall of said first rail;
(p) calculating a first reference plane using said first, second and third points on said first rail;
(q) recording the spatial location of a first point on the end wall of said second rail;
(r) recording the spatial location of a second point on the end wall of said second rail;
(s) recording the spatial location of a third point on the end wall of said second rail;
(t) calculating a second reference plane using said first, second and third points on said second rail; and,
(u) using one of said planes as the reference of said coordinates during said processing of the data associated with said positions.

13. A method as defined in claim 2 further including:
(j) recording the spatial location of a first point on the end wall of said first rail;
(k) recording the spatial location of a second point on the end wall of said first rail;
(l) recording the spatial location of a third point on the end wall of said first rail;
(m) calculating a first reference plane using said first, second and third points on said first rail;
(n) recording the spatial location of a first point on the end wall of said second rail;
(o) recording the spatial location of a second point on the end wall of said second rail;
(p) recording the spatial location of a third point on the end wall of said second rail;
(q) calculating a second reference plane using said first, second and third points on said second rail; and,
(r) using one of said planes as the reference of said coordinates during said processing of the data associated with said positions.

14. A method as defined in claim 1 further including:
(g) sensing the actual z coordinate of said torch after said processing act at the end of the series of points constituting a specific layer;
(h) comparing said actual z coordinate with a value representative of the layer height of said specific layer if said specific layer can be repeated; and,
(i) repeating the processing of the positions constituting said specific layer if said comparison indicates that the actual z coordinate is lower than the desired height of said specific layer.

15. The method as defined in claim 14 wherein said sensing is accomplished by a KAREL program.

16. A method as defined in claim 15 further including:
(j) recording the spatial location of a first point on the end wall of said first rail;
(k) recording the spatial location of a second point on the end wall of said first rail;
(l) recording the spatial location of a third point on the end wall of said first rail;
(m) calculating a first reference plane using said first, second and third points on said first rail;
(n) recording the spatial location of a first point on the end wall of said second rail;
(o) recording the spatial location of a second point on the end wall of said second rail;
(p) recording the spatial location of a third point on the end wall of said second rail;
(q) calculating a second reference plane using said first, second and third points on said second rail; and,
(r) using one of said planes as the reference of said coordinates during said processing of the data associated with said positions.

17. A method as defined in claim 14 further including:

(j) recording the spatial location first point on the end wall of said first rail;

(k) recording the spatial location of a second point on the end wall of said first rail;

(l) recording the spatial location of a third point on the end wall of said first rail;

(m) calculating a first reference plane using said first, second and third points on said first rail;

(n) recording the spatial location of a first point on the end wall of said second rail;

(o) recording the spatial location of a second point on the end wall of said second rail;

(p) recording the spatial location of a third point on the end wall of said second rail;

(q) calculating a second reference plane using said first, second and third points on said second rail; and, (r) using one of said planes as the reference of said coordinates during said processing of the data associated with said positions.

18. A method as defined in claim 1 including the acts of:

(g) recording the spatial location of a first point on the end wall of said first rail;

(h) recording the spatial location of a second point on the end wall of said first rail;

(i) recording the spatial location of a third point on the end wall of said first rail;

(j) calculating a first reference plane using said first, second and third points on said first rail;

(k) recording the spatial location of a first point on the end wall of said second rail;

(l) recording the spatial location of a second point on the end wall of said second rail;

(m) recording the spatial location of a third point on the end wall of said second rail;

(n) calculating a second reference plane using said first, second and third points on said second rail; and, (o) using one of said planes as the reference of said coordinates during said processing of the data associated with said positions.

19. A method for automatically filling the narrow gap between facing end walls of adjacent first and second railway rails by depositing vertically spaced layers of molten metal in said gap with an electric arc welding torch using a robotic mechanism that moves said torch in a path in said gap in a pattern controlled by a low level robotic executive program from a spatial position to a next spatial position, said method comprising:

(a) providing a master data array for an ideal gap configuration, said master data array constituting a series of positions making up an idealized progression of said torch to fill said ideal gap in a number of vertically spaced layers made up of multiple positions, each of said positions identified by (1) at least four coordinates, (2) the layer in which the torch position is a part and (3) the welding parameters to be executed until the torch reaches the next fixed position;

(b) outputting said series of positions from said data array for causing movement of said torch from position to position to perform said welding parameters;

(c) constructing a first reference plane by sensing points on the end wall of said first rail;

(d) constructing a second reference plane by sensing points on the end wall of said second rail;

(e) using said first and second reference planes to construct a representation of the actual gap being filled;

(f) modifying the outputted positions form said data array for use in controlling movement of said torch based upon deviation of said actual gap from said ideal gap.

20. The method as defined in claim 19 wherein said causing is by a robotic program and said modifying is by a background program.

21. The method as defined in claim 20 wherein said background program is a KAREL program.

22. A method as defined in claim 21 further including:

(g) sensing the actual z coordinate of said torch;

(h) after movement of said torch to the last position in a specific layer, determining if the layer can be repeated, and if so determining if said torch is at a z coordinate indicative of proper completion of a layer;

(i) if said determination is negative, repeating processing the positions constituting said specific layer.

23. The method as defined in claim 22 wherein said sensing is accomplished by a KAREL program.

24. The method as defined in claim 23 wherein said sensing is accomplished by a KAREL program.

25. A system for automatically filling the narrow gap between facing end walls of adjacent first and second railway rails by depositing vertically spaced layers of molten metal in said gap with an electric arc welding torch using a robotic mechanism that moves said torch in a path in said gap in a patter controlled by a low level robotic executive program from a spatial position to a next spatial position, said system comprising a master data array for an ideal gap configuration, said master data array constituting a series of positions making up an idealized progression of said torch to fill said ideal gap in a number of vertically spaced layers made up of multiple positions, each of said positions identified by at least (1) four coordinates, (2) the layer in which the torch position is a part and (3) the welding parameters to be executed until the torch reaches the next fixed position; a computer for outputting said series of positions from said data array for use by said robotic mechanism to cause movement of said torch from position to position to perform said welding parameters; a program for constructing a first reference plane by sensing points on the end wall of said first rail and a second reference plane by sensing points on the end wall of said second rail; a basic background program using said first and second reference planes to construct a representation of the actual gap being filled; a background program modifying the outputted positions form said data array for use in controlling movement of said torch based upon deviation of said actual gap from said ideal gap.

26. A system as defined in claim 25 wherein a stylus carried by said torch is used to sense said points prior to using said robotic mechanism for filling said gap.

27. A system as defined in claim 26 including means for sensing the actual z coordinate of said torch; means for determining if said torch is at a z coordinate indicative of completion of a specific layer; means for repeating movement determined by the positions constituting said specific layer if the sensed z coordinate indicates that said specific layer is not completed.

28. A system as defined in claim 25 including means for sensing the actual z coordinate of said torch; means for determining if said torch is at a z coordinate indicative of completion of a specific layer; means for repeating movement determined by the position constituting said specific layer if the sensed z coordinate indicates that said specific layer is not completed.

* * * * *